(12) United States Patent
Kino et al.

(10) Patent No.: US 6,499,852 B1
(45) Date of Patent: Dec. 31, 2002

(54) VEHICLE DISPLAY LIGHTING DEVICE

(75) Inventors: Norihito Kino, Aichi-ken (JP);
Toshinori Takahashi, Aichi-ken (JP);
Satoshi Inagaki, Aichi-ken (JP);
Yoshiaki Ito, Aichi-ken (JP); Makoto Tamaki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/656,164

(22) Filed: Sep. 6, 2000

(30) Foreign Application Priority Data

Sep. 7, 1999 (JP) .......................................... 11-252546
Sep. 28, 1999 (JP) .......................................... 11-274024

(51) Int. Cl.$^7$ ............................................. G01D 11/28
(52) U.S. Cl. .......................... 362/23; 362/26; 362/27; 362/30; 362/489
(58) Field of Search ...................... 362/23, 26–30, 362/85, 489; 116/47, 48, 49

(56) References Cited

U.S. PATENT DOCUMENTS

| | | | | |
|---|---|---|---|---|
| 4,044,708 A | * | 8/1977 | Klein | 116/129 |
| 5,198,690 A | * | 3/1993 | Kitagawa et al. | 257/200 |
| 5,556,187 A | * | 9/1996 | Furuya et al. | 362/27 |
| 5,821,867 A | * | 10/1998 | Angell et al. | 340/815.45 |
| 5,839,811 A | * | 11/1998 | Shimura | 362/30 |
| 5,920,150 A | * | 7/1999 | Crary et al. | 313/484 |
| 5,997,161 A | * | 12/1999 | Stringfellow et al. | 362/489 |
| 6,186,633 B1 | * | 2/2001 | Zen et al. | 362/23 |
| 6,364,498 B1 | * | 4/2002 | Burbank | 362/84 |
| 6,367,940 B1 | * | 4/2002 | Parker et al. | 362/29 |

FOREIGN PATENT DOCUMENTS

JP          10-197671          7/1998

* cited by examiner

Primary Examiner—Sandra O'Shea
Assistant Examiner—Anabel Ton
(74) Attorney, Agent, or Firm—Pillsbury Winthrop LLP

(57) ABSTRACT

A vehicle display lighting device the lighting device includes a light emitting assembly arranged along the outer circumference of the display dial in front of the front surface. The light emitting assembly directs lights across at least the front surface of the display dial. The lighting device also includes a control assembly for controlling the operation of the light emitting assembly. The light emitting assembly may one or more light sources for emitting light, and a transmitting assembly for radiating the light from the light source across at least the front surface of the display dial.

29 Claims, 22 Drawing Sheets

VEHICLE DISPLAY LIGHTING DEVICE

FIELD OF THE INVENTION

This invention relates to a vehicle display lighting device, particularly, to a lighting device using a light emitting diode (LED) to directly illuminate an interior of a vehicle display such as a speedometer, a tachometer, etc.

BACKGROUND OF THE INVENTION

There are numerous conventional vehicle display lighting devices used to illuminate a dashboard display of a vehicle. These conventional lighting devices include indirect lighting devices, edge-light lighting devices, transmission lighting devices, and direct lighting devices.

The indirect lighting device has a light source disposed inside a vehicle display or at a rear side of a display dial. The light from the light source radiates toward a front side of the display dial and is reflected by an interior surface of a display case. The reflected light indirectly lights up various symbols on the display dial and an indicator pointer.

The edge-light lighting device includes a display dial having a light guide plate formed of a transparent synthetic resin. A light source is arranged inside the vehicle display to direct the light toward an edge portion of the dial. The display dial guides the light therein and radiates the incident light toward a front side of the display dial, thereby illuminating the symbols of the display dial as well as the indicator pointer.

The transmission lighting device has a display dial formed from a transparent or semi-transparent material. A display surface of the display dial is made opaque except for the symbols and indicia formed thereon, which are transparent or semi-transparent and form light-transmitting portions. A light source is arranged inside the vehicle display so as to emit light from the rear side of the display dial toward the light-transmitting portions corresponding to the symbols. The symbols of the display dial and the indicator pointer are illuminated.

The direct lighting device has a light source disposed either at/or in front of the display dial. The light source directly illuminates the front surface of the display dial including the display symbols and the indicator pointer.

In each of the lighting devices described above, an incandescent lamp is generally used as the light source. With the exception of the direct lighting device, the light source is disposed inside the vehicle display, which requires a special space inside the vehicle display for installation of the light source. This increases the thickness or depth of the vehicle display and results in a complicated internal structure. Moreover, since the light is radiated from inside the vehicle display to the front side of the display dial, a transmission path of the light becomes comparatively long. Consequently, the light is attenuated, so that luminous efficacy of the light source is possibly lowered. Each of these devices has potential advantages but poses significant drawbacks. The transmission lighting device is known for increasing visibility of the vehicle display. Its luminous efficacy, however, is lessened depending on a transmissivity of the light-transmitting portion of the dial. The conventional direct lighting device is ideal in a viewpoint of the luminous efficacy. The direct lighting device, however, radiates the light from either an upper front side or lower front side of the display dial, while an optical axis thereof is inclined to the plane of the display dial. As a result, the illumination differs between the upper side and the lower side of the display dial. Furthermore, the indicator pointer casts a shadow on the front surface of the display dial. Thus, the visibility of the display is reduced.

OBJECTS OF THE INVENTION

It is an object of the present invention to provide a vehicle display lighting device having a simplified internal structure.

It is another object of the present invention to provide a vehicle display lighting device that results in a vehicle display having a reduced thickness.

It is another object of the present invention to provide a vehicle display lighting device having improved luminous efficacy.

It is another object of the present invention to provide a vehicle display lighting device having uniform illumination across the entire display dial.

It is another object of the present invention to provide a vehicle display lighting device that prevents an indicator pointer from casting a shadow on the display dial.

Additional objects and advantages of the invention are set forth, in part, in the description which follows, and, in part, will be apparent to one of ordinary skill in the art from the description and/or practice of the invention.

SUMMARY OF THE INVENTION

In response to the foregoing challenges, applicants have developed an innovative vehicle display lighting device for a vehicle display having a display dial. The display dial has a front surface, an outer circumference and at least one indicator pointer spaced from the front surface. In accordance with the present invention, the lighting device includes a light emitting assembly arranged along the outer circumference of the display dial in front of the front surface. The light emitting assembly directs lights across at least the front surface of the display dial. The lighting device also includes a control assembly for controlling the operation of the light emitting assembly.

In accordance with the present invention, it is contemplated that the light emitting assembly may include one or more light sources for emitting light, and a transmitting assembly for radiating the light from the light source across at least the front surface of the display dial.

The transmitting assembly is positioned adjacent the outer circumference of the display dial. The transmitting assembly may include a light guide ring positioned adjacent the outer circumference of the display dial. The light from the light sources is transmitted through the light guide ring. The light guide ring may include a coating on at least one surface to direct light from the light source inwardly to the center of the front surface.

It is contemplated that the light guide ring may direct light only across the front surface of the display dial. With this arrangement, the light guide ring is positioned adjacent the outer circumference between the front surface and the indicator pointer.

It is also contemplated that the light guide ring may direct light across the front surface of the display dial and the indicator pointer. With this arrangement, the light guide ring may be positioned adjacent the outer circumference in front of the front surface and the indicator pointer. Alternatively, the light guide ring may positioned adjacent the outer circumference such that the light guide ring extends from the front surface to a point in front of the indicator pointer.

In accordance with the present invention, the light guide ring includes a pair of free ends. At least one light source may be positioned adjacent each free of the light guide ring. A light source housing is secured to each free end of the light guide ring. The lighting device also includes a flexible printed circuit board. Each light source housing is secured to the flexible printed circuit board. The light sources are electrically connected to the flexible printed circuit board. The control assembly is also electrically connected to the flexible printed circuit board.

Alternatively, the transmitting assembly may include a reflection mirror positioned adjacent the outer circumference of the display dial. The light from the light source is reflected by the reflection mirror toward the center of the front surface. It is contemplated that a plurality of light sources may be located adjacent the outer circumference of the display dial adjacent the reflection mirror.

In accordance with the present invention, the light emitting assembly may include plurality of light sources for emitting light. The plurality of light sources are located adjacent the outer circumference of the display dial. The light sources are electrically connected to a flexible printed circuit board that is positioned adjacent the outer circumference of the display dial. The plurality of light sources may emit light only across the front surface of the display dial. With this arrangement, the light sources are positioned adjacent the outer circumference between the front surface and the indicator pointer. It is also contemplated that the light sources may emit light across the front surface of the display dial and the indicator pointer. With this arrangement, the light sources are positioned adjacent the outer circumference in front of the front surface and the indicator pointer.

In response to the foregoing challenges, applicants have also developed an innovative lighting device having a support member positioned in front of the front surface and the indicator pointer. The support member includes an end portion that covers a portion of the front surface and the indicator pointer. The lighting device further includes a light emitting assembly located on the support member. The light emitting assembly may include a plurality of light sources for emitting light. The light emitting assembly is adapted to direct light across the front surface and the indicator pointer of the display dial. The lighting device also includes a control assembly for controlling the operation of the light emitting assembly.

BRIEF DESCRIPTION OF THE DRAWINGS

The invention will be described in conjunction with the following drawings in which like reference numerals designate like elements and wherein.

DETAILED DESCRIPTION OF THE INVENTION

A vehicle display lighting device according to a first embodiment of the present invention is illustrated in FIGS. 1–9. The display lighting device is used for a vehicle display having several individual displays representing various engine operating conditions, vehicle speed, etc. The vehicle display has a display case 10 formed from an opaque synthetic resin and an instrument base 50 fitted to a front of the display case 10. A longitudinally extending slot 11 is formed at a lower center position on a rear side of the display case 10. A plurality of screw receiving protrusions 12 are located on the rear side of the case 10 near the slot 11.

Figure 1:
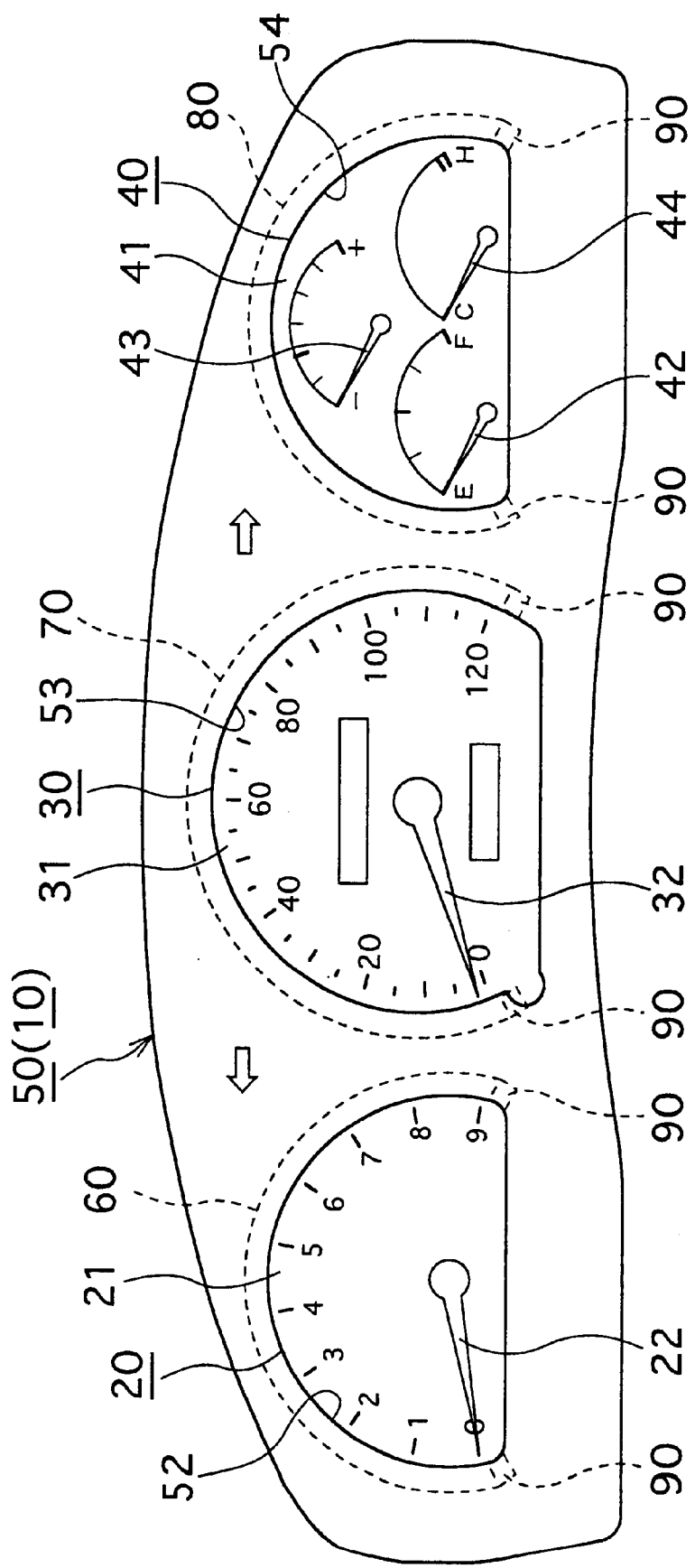
FIG. 1 is a front view of a vehicle display incorporating a vehicle display lighting device according to a first embodiment of the present invention.

As shown in FIG. 1, the vehicle display includes a tachometer 20. The tachometer 20 has a display dial 21 and a movable indicator pointer 22. Various symbols including a scale and characters for indicating engine speed are arranged at fixed intervals on an outer circumferential portion of the display dial 21. The vehicle display further includes a speedometer 30. The speedometer 30 has a display dial 31 and a movable indicator pointer 32. Various symbols including a scale and characters for indicating a vehicle speed are arranged at fixed intervals on an outer circumferential portion of the dial 31. Additionally, the vehicle display includes an auxiliary display 40. The auxiliary display 40 is composed of various gauges including but not limited to a fuel gauge, voltmeter and temperature gauge. The auxiliary display 40 has a display dial 41 and movable indicator pointers 42, 43 and 44 of the respective gauges or displays. Various symbols including scales and characters for indicating variables (e.g., fuel amount, battery voltage and coolant temperature) are arranged at fixed intervals on outer circumferential portions of the gauges or displays, respectively, on the display dial 41. The present invention is in no way limited to the above-described meters and/or gauges; rather, it is contemplated the vehicle display may include any combination of these meters. Furthermore, it is contemplated that additional meters may be added to provide the vehicle operator with indicators for interior temperature, exterior temperature, engine temperature, etc.

Figure 2:
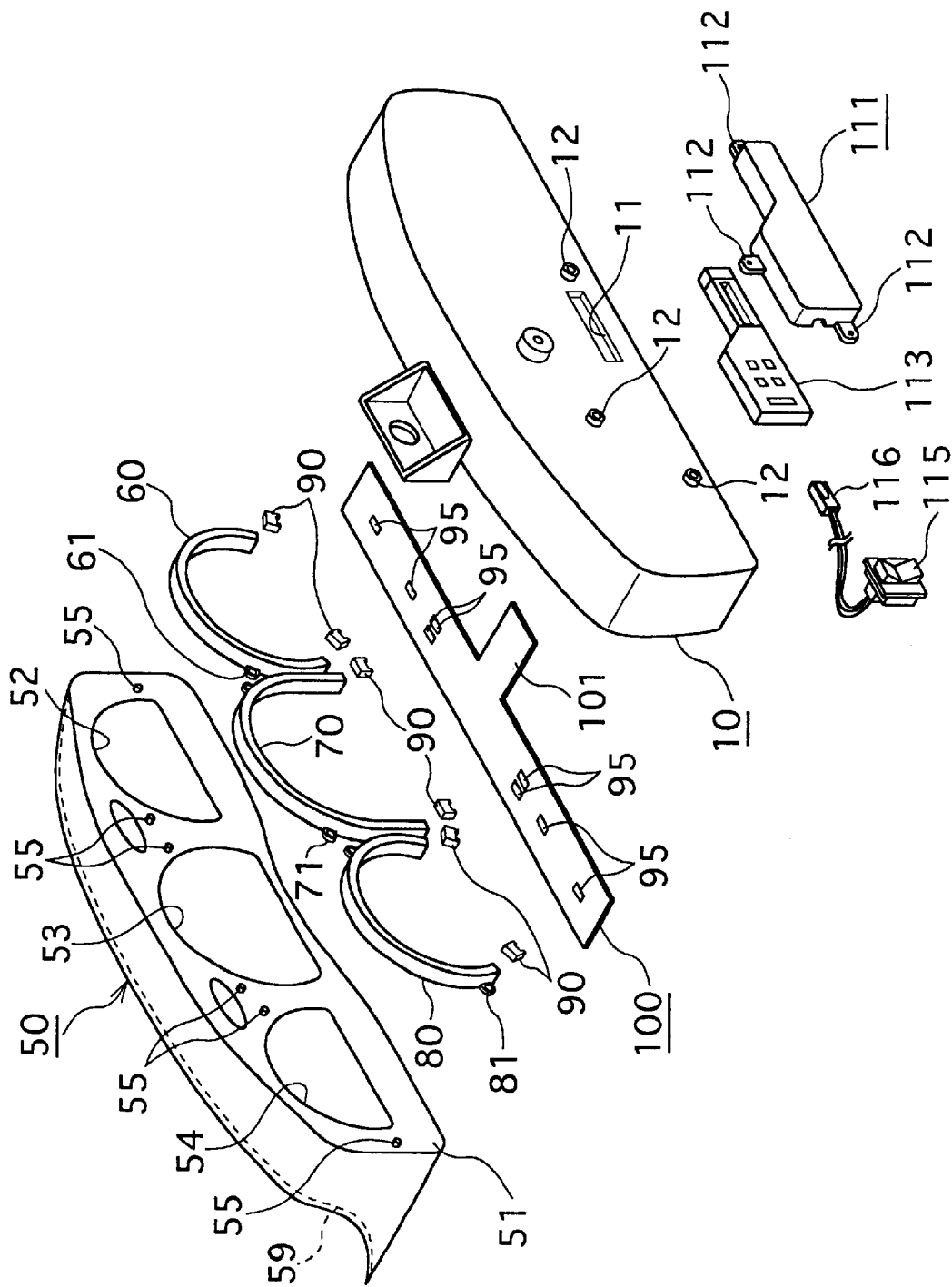
FIG. 2 is an exploded rear view of the vehicle display using the vehicle display lighting device according to the first embodiment of the lighting device.
Figure 7:
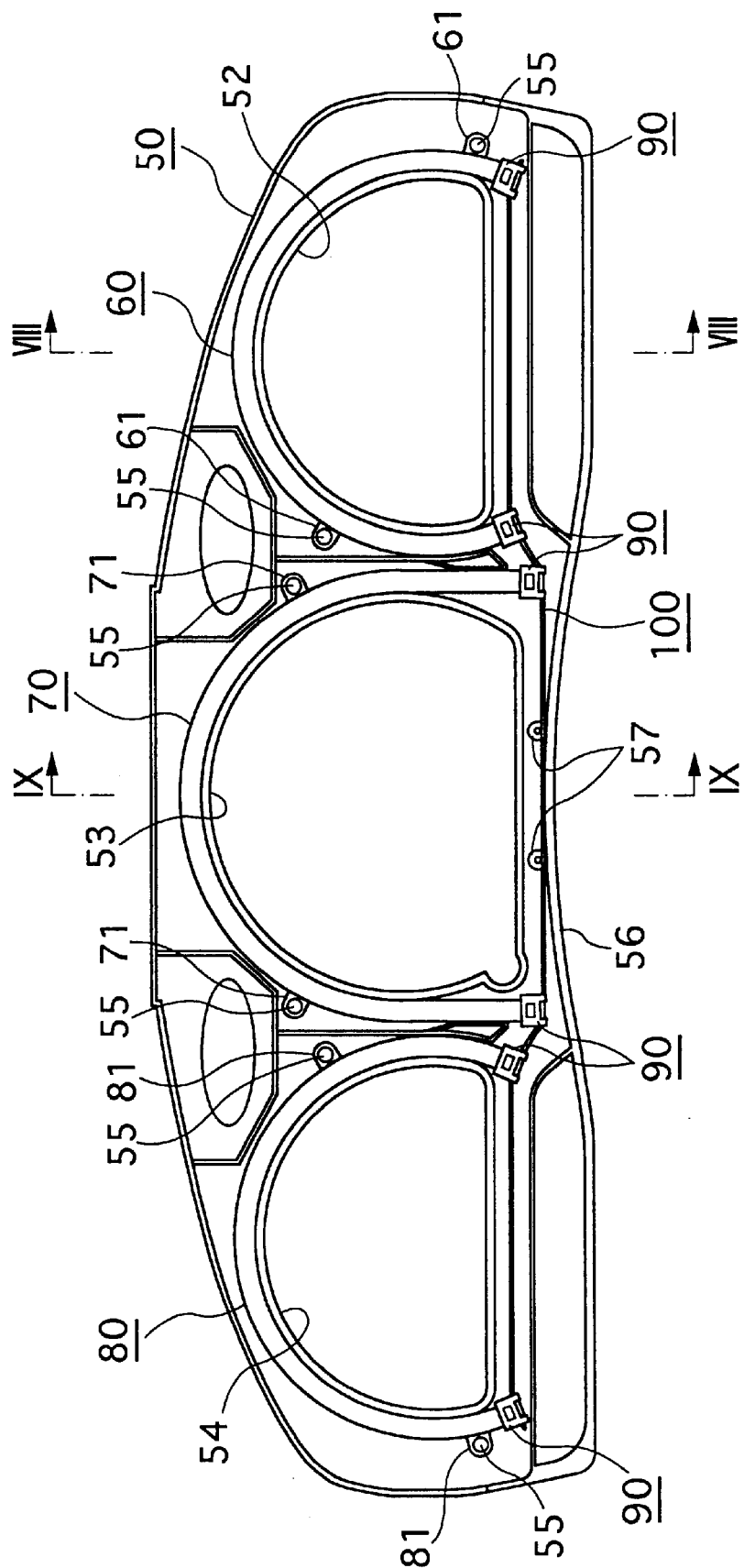
FIG. 7 is a rear view of the vehicle display of FIG. 1 illustrating the vehicle display lighting device attached to the vehicle display.

The instrument base 50 is preferably formed from an opaque synthetic resin. The instrument base 50 has a flat masking plate 51 formed at a rear side thereof. The masking plate 51 has openings 52, 53 and 54 at positions corresponding to the tachometer 20, speedometer 30 and auxiliary display 40. The display dials 21, 31 and 41 as well as the movable indicator pointers 22, 32, 42, 43 and 44 of the displays 20, 30 and 40 are visible through the openings 52, 53 and 54, respectively. Cylindrical caulking protrusions 55 are integrally formed at predetermined positions around the openings 52, 53, 54 on a rear surface of the masking plate 51, as shown in FIG. 2. The protrusions 55 are used to secure light guide rings 60, 70 and 80, described below, to the masking plate 51. Referring to FIG. 7, a flange 56 extends longitudinally along a lower end of the instrument base 50. Right and left pressing protrusions 57 are formed on an upper surface of a center part of the flange 56. A cover lens 59 is fitted into an opening at the front of the instrument base 50.

As shown in FIG. 7, the vehicle display lighting device has a plurality of light guide rings 60, 70, 80 having a substantially arcuate shape. The present invention, however, is not limited to the above-described shapes; rather, it is contemplated that numerous other shapes can be used, if desired, so long as the shape of the guide rings corresponds to the selected shape of openings 52, 53 and 54. Each of the light guide rings 70, 80, 90 is formed of a material that easily transmits light, such as a transparent acrylic resin. The light guide rings 60, 70, 80 have inner diameters that are slightly larger than the diameters of the openings 52, 53, 54, respectively. The rings 60, 70, 80 are disposed along circumferences of the openings 52, 53, 54 of the masking plate 51, respectively. When positioned on the masking plate, the rings 60, 70, 80 are not visible through the openings 52, 53, 54. Attaching pieces 61, 71 and 81 are integrally formed on one side of the light guide rings 60, 70 and 80, respectively, at positions corresponding to the caulking protrusions 55.

The light guide rings 60, 70, 80 are secured to the masking plate 51 by inserting caulking protrusions 55 into apertures in the attaching pieces 61, 71, 81. The leading ends of the caulking protrusions 55, which protrude through the attaching pieces 61, 71, 81 are thermally caulked. Thus, the light guide rings 60, 70, 80 are fixedly joined along the circumferences of the openings 52, 53, 54 of the instrument base 50. The present invention is not limited to the above-described assembly for fastening the light guide rings 60, 70, 80 to the base 10; rather, other joining means can be used, such as clips or fasteners, screws, adhesives and the like.

Figure 8:
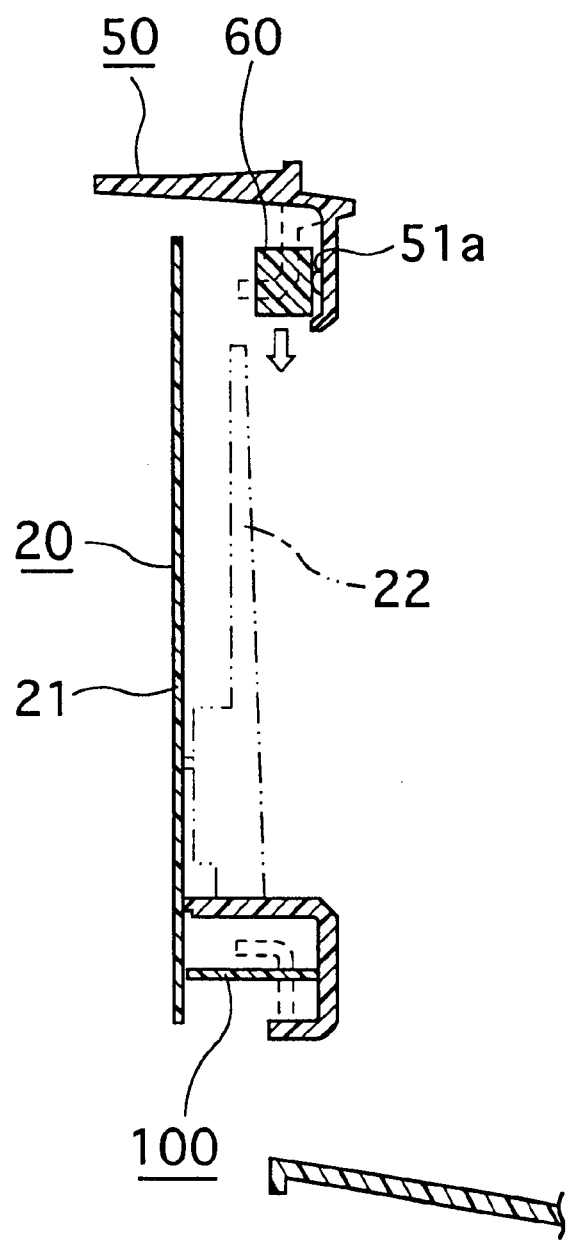
FIG. 8 is a cross-sectional view taken along line VIII—VIII of FIG. 7.
Figure 9:
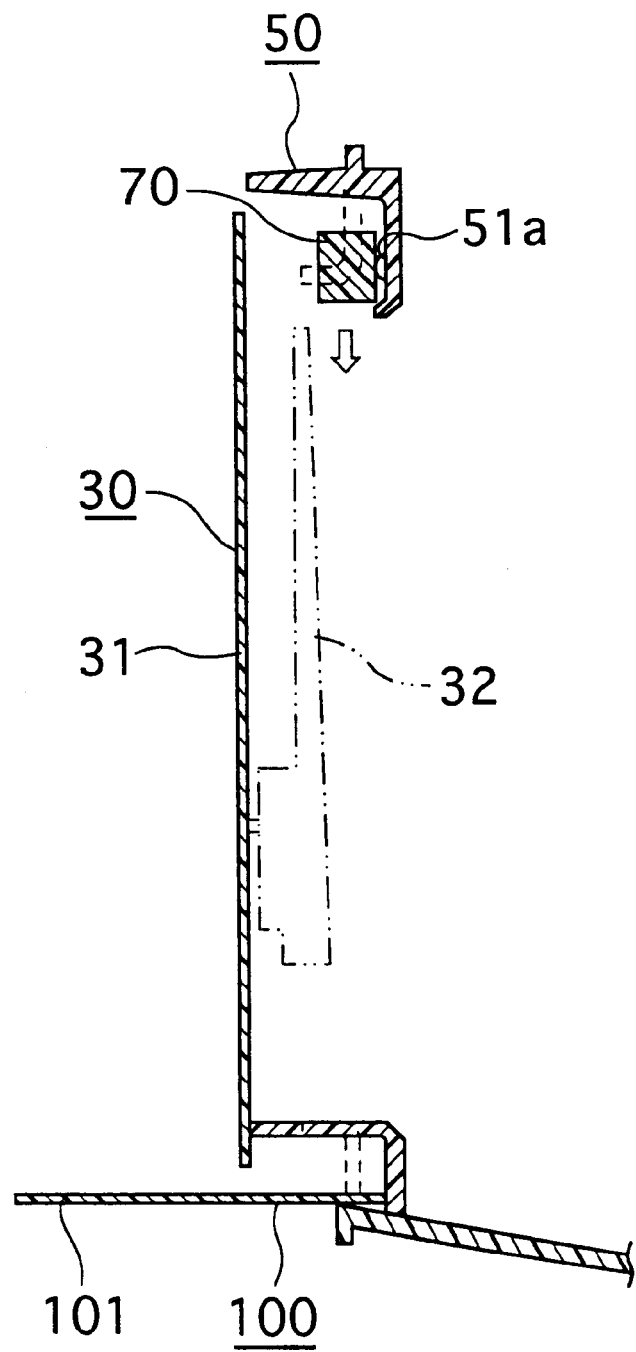
FIG. 9 is a cross-sectional view taken along line IX—IX of FIG. 7.

As shown in FIGS. 8 and 9, the light guide rings 60, 70, 80 are disposed in front of the movable indicator pointers 22, 32, 42, 43, 44 in a direction perpendicular to a plane of the display dials 21, 31, 41. As described above, the light guide rings 60, 70, 80 are arranged along the outer circumferences of the display dials 21, 31, 41 at the front thereof. Light enters opposite ends of the light guide rings 60, 70, 80, respectively. Incident light is guided by the light guide rings 60, 70, 80 in the circumferential direction. The light is radiated inward from an inner peripheral surface of the light guide rings 60, 70, 80, as shown by the arrows in FIGS. 8 and 9. The light is radiated in many directions from an outer circumference toward the center of the display dials 21, 31, 41. It is preferable to provide the outer peripheral surface, the front surface and the rear surface of the rings 60, 70, 80 with a reflecting film such as a white paint, reflecting agent or the like, which reflects the light inwardly toward the display dials 21, 31, 41.

Supporting protrusions 51a are formed on the inner surface of the instrument base 50 adjacent to the rings 60, 70, 80, respectively. The rings 60, 70, 80 are fixed to the instrument base 50 while the front surfaces are in contact with the supporting protrusions 51a, as shown in FIGS. 8 and 9.

Figure 3:
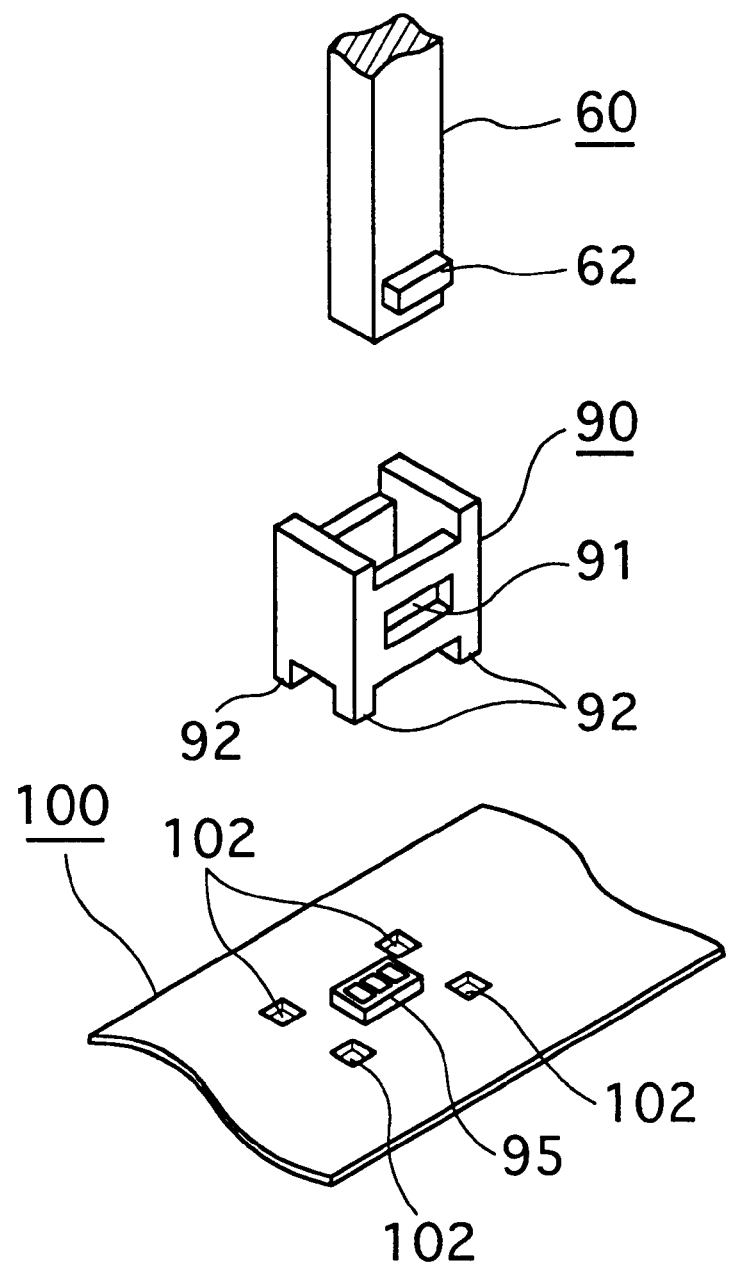
FIG. 3 is a perspective view of the light sources and a light guide ring of the first embodiment of the vehicle display lighting device.
Figure 4:
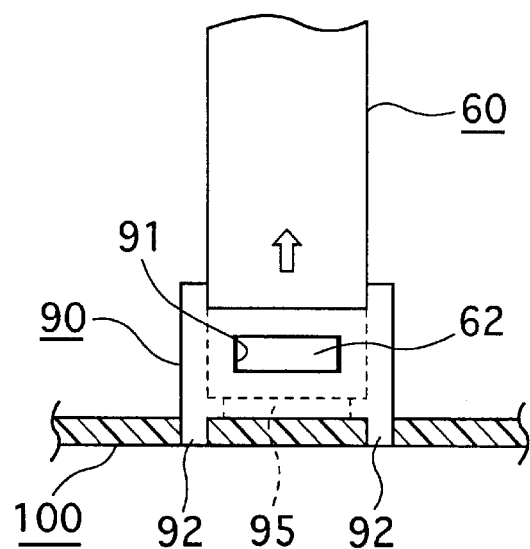
FIG. 4 is a partial cross-sectional rear view of the light sources fitted to the light guide ring of FIG. 3.

As shown in FIG. 3, fixing protrusions 62 are integrally formed at each end of a rear surface of each of the light guide rings 60, 70, 80. Each fixing protrusion 62 has substantially a rectangular parallelepiped shape and protrudes from a position adjacent the ends of the rings 60, 70, 80. An LED case 90 is secured to the opposite ends of each ring 60, 70, 80. The LED case 90 is formed of a synthetic resin material in a parallelepiped tubular shape with open upper and lower ends. The LED case 90 has a fixing hole 91 at a rear surface thereof. The fixing hole 91 has a shape that is complementary to the fixing protrusion 62. A LED case 90 is fitted to each end of the rings 60, 70, 80. The fixing protrusion 62 is elastically deformed and snaps into the fixing hole 91 of the LED case 90 such that the LED case 90 is held in close contact with its respective rings 60, 70, 80.

At least one light source 95 is housed in a lower part of each of the LED cases 90. The light sources 95 are located on opposite ends of the rings 60, 70, 80. The light sources 95 preferably include a multi-color LED having three primary color light emitting elements including a red element R, green element G and blue element B. The combination of and selective operation of the individual red, green and blue elements of each light source can produce any desired color of light including white. Each light source 95 is mounted on a flexible printed circuit board (PCB) 100. The flexible PCB 100 has a generally elongated shape with a length corresponding to the width of the lower end of the instrument base 50. A flexible short terminal portion 101 is formed integrally on a center part of a rear edge of the flexible PCB 100, as shown in FIG. 2. When assembled, the terminal portion 101 extends through the opening 11 in the case 10. As shown in FIG. 2, the PCB 100 extends between adjacent display dials such that a single control unit 113 can operate the lighting devices for each display dial.

Each LED case 90 has four securing protrusions 92 located on the lower corners. Each securing protrusion 92 extends into a complementary opening 102 in the flexible PCB 100. The securing protrusions 102 are secured to the securing holes 92 by a suitable adhesive or the like. With this arrangement, the flexible PCB 100 is supported by the LED case 90 in the instrument base 50 and case 10. The terminal portion 101 is inserted and held between the inner surface of the flange 56 of the instrument base 50 and the pressing protrusions 57.

Figure 5:
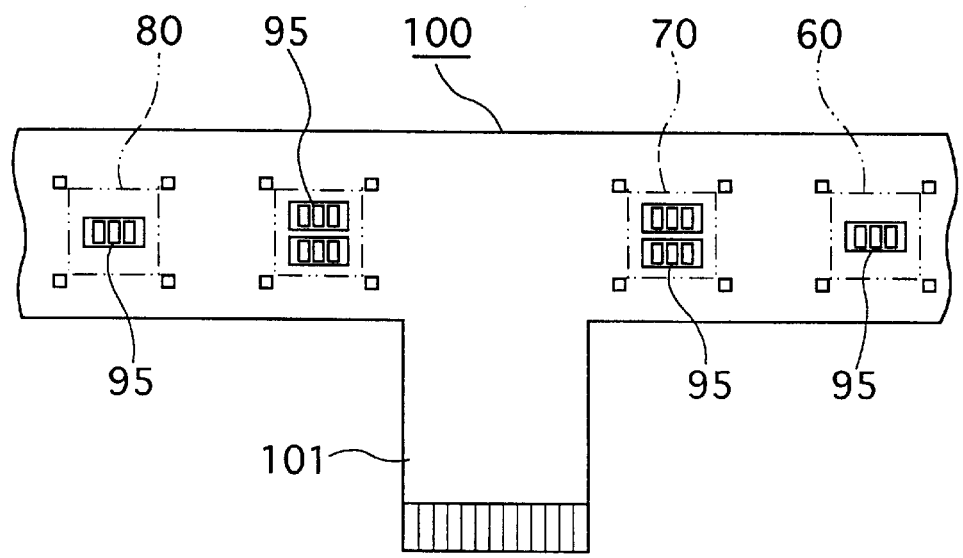
FIG. 5 is a plan view of a flexible printed circuit board of the vehicle display lighting device according to a first embodiment of the present invention.

As shown in FIG. 5, one or more light sources 95 are mounted on the flexible PCB 100 within the area surrounded by the securing holes 102. One light source 95 is provided at each lower end of the rings 60, 80, while two light sources 95 are provided at each lower end of the ring 70. Additional light sources are provided for the ring 70 to provide additional light for the speedometer 30 that has a relatively larger diameter and area compared to the other displays.

Figure 6:
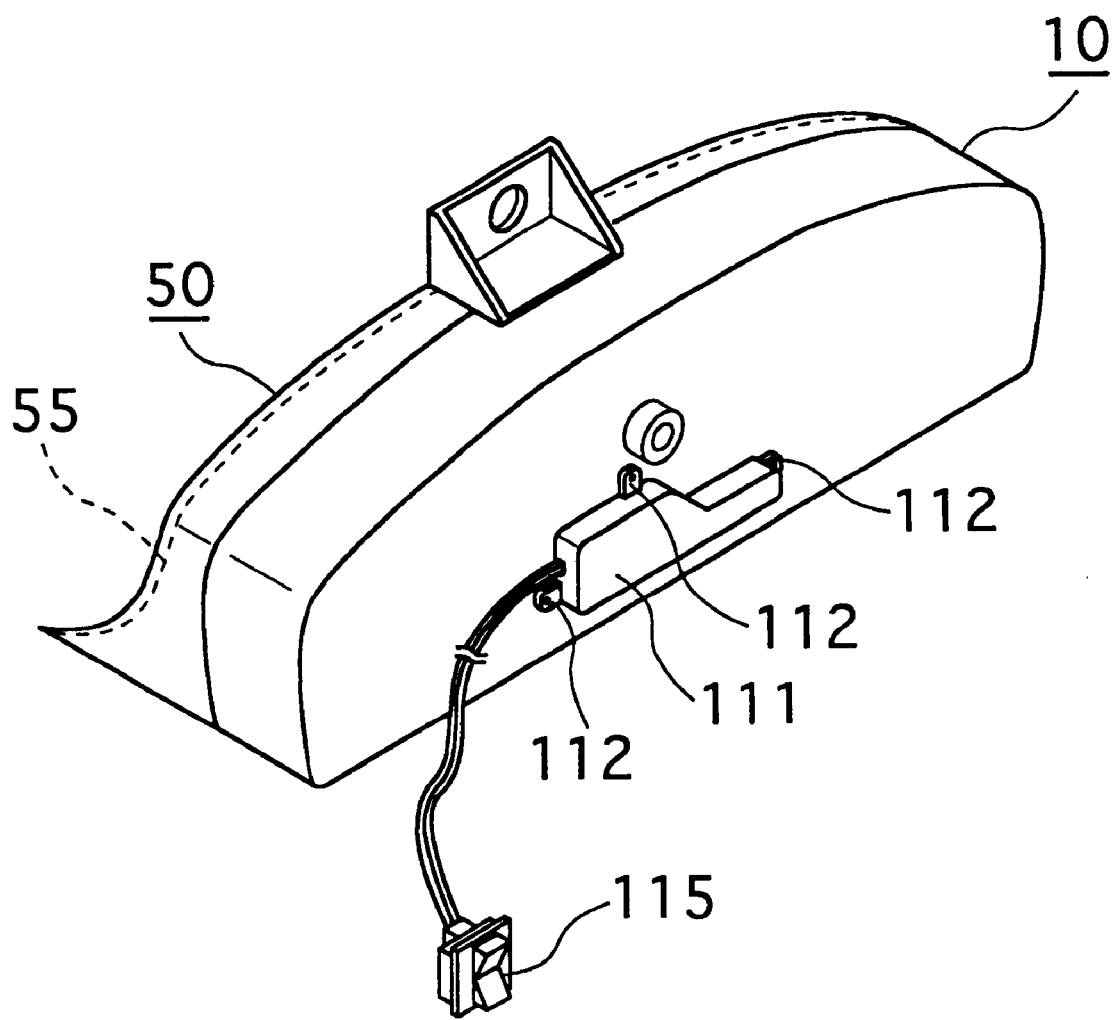
FIG. 6 is a rear perspective view of an assembled vehicle display using the vehicle display lighting device according to the first embodiment of the present invention.

FIG. 6 illustrates the display case 10 and the instrument base 50 in an assembled state. As discussed above, the terminal portion 101 extends through the slot 11 in the display case 10. A control unit cover 111 is fitted to the rear surface of the display case 10. A plurality of holding pieces 112 are integrally formed on the outer surface of the control unit cover 111 at positions corresponding to the screw receiving protrusion 12 of the display case 10. A screw (not shown) is inserted into the hole of the holding piece 112 and screwed into the screw receiving protrusion 12, so that the control unit cover 111 is secured to the rear surface of the display case 10.

The control unit cover 111 houses therein a control unit 113 serving as a light emission drive circuit. The terminal portion 101 of the flexible PCB 100 is connected with the control unit 113. The control unit 113 controls the operation of the light sources 95 to emit the light. A color switch 115 is also connected with the control unit 113 via a terminal 116. When the color switch 115 is operated, the control unit 113 can change the light emitted from the light sources 95 into any desired color. When the control unit 113 drives the light sources 95, the light sources 95 emit light toward the interior of the rings 60, 70, 80. The rings 60, 70, 80 radiate the light toward the center of the display dials 21, 31, 41 and between the display dials 21, 31, 41 and the movable indicator pointers 22, 32, 42.

The operation of the vehicle display lighting device according to the embodiment described in FIGS. 1–9 will now be described. In the vehicle display lighting device, a fixed switch (not shown) such as an instrument dimmer switch is operated when the vehicle display needs to be illuminated at night or the like. It is contemplated that the vehicle display lighting device may be automatically operated when a sensor determines that the vehicle display needs to be illuminated. The control unit 113 controls the light sources 95 via the flexible PCB 100. The light radiates into the rings 60, 70, 80 at opposite ends thereof adjacent the LED cases 90. The incident light propagates in the circumferential direction inside the rings 60, 70, 80. The rings 60, 70, 80 radiate the light toward the center of the display dials 21, 31, 41 at the front sides thereof The light is radiated directly to the display dials 21, 31, 41 and the movable indicator pointers 22, 32, 42 via the rings 60, 70, 80. With this arrangement, the transmission path of the light of the light sources 95 is short and the attenuation rate of the light is small. Consequently, it is possible to illuminate the vehicle display with fewer light sources when compared to the conventional devices.

The light sources 95 and the light guide rings 60, 70, 80 are located on the front side of the display dials 21, 31, 41 and are an external structure of the vehicle display (i.e., the light sources 95 and the rings 60, 70, 80 are disposed not at the inside but at the outside (front side) of the display dials 21, 31, 41). The light sources 95 directly illuminate the display dials 21, 31, 41 and the movable indicator pointers 22, 32, 42 from the front side of the display dials 21, 31, 41. Consequently, the vehicle display lighting device does not require any special spatial considerations for installing the display illuminating members such as the light source, light guide plate and the like with the vehicle display. As such, the thickness and construction of the interior structure of the vehicle display can be decreased and simplified. Thus, the vehicle display can be thin and compact.

With this arrangement, the light is radiated inwardly toward the drive shaft of the movable indicator pointers 22, 32, 42 along the entire arcuate ring 60, 70, 80. As a result, even if the movable indicator pointers 22, 32, 42 cast a shadow on the display dials 21, 31, 41 in one direction, such shadow disappears due to the light radiating from other portions of the rings 60, 70, 80. As a result, there are no visible shadows of the movable indicator pointers 22, 32, 42 on the display dials 21, 31, 41 and the visibility of the vehicle display is improved. In addition, the rings 60, 70, 80 are provided on the entire circumference of the display dials 21, 31, 41 so as to uniformly illuminate the symbols on the display dials 21, 31, 41. Consequently, the illumination does not vary between the upper and lower parts of the display dials 21, 31, 41, which improves the visibility of the displays.

As discussed above, the vehicle display lighting device is disposed at the outer circumference of the display dials 21, 31, 41 and is covered by the masking plate 51 so as not to be seen from by the vehicle operator. As such, the lighting device according to the present invention does not deter and/or impact the design effects of the vehicle display because it is not visible to the vehicle operator.

In the first embodiment, the light source 95 is a multi-color LED having the three primary colors of LED chips and the color switch 115 is connected with the control unit 113. The light source 95 can be illuminated in any desired color. Consequently, the light emission color of the light source 95 can be changed as desired so as to illuminate the vehicle display in such desired color. As a result, a variety of illumination effects can be achieved. The present invention, however, is not limited solely to the use of LEDs; rather, other small light sources are considered to be well within the scope of the present invention.

Figure 10:
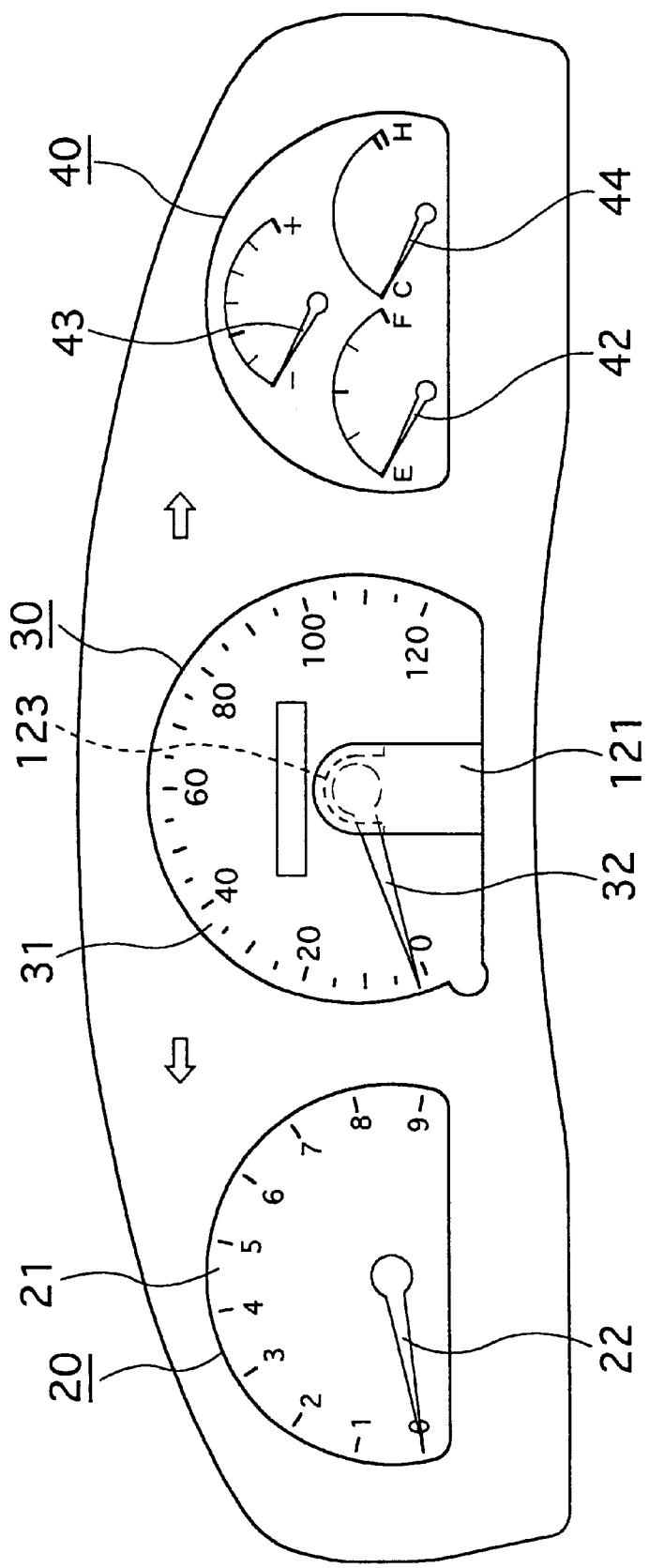
FIG. 10 is a front view of a vehicle display incorporating a vehicle display lighting device according to a second embodiment of the present invention.

A vehicle display lighting device according to a second embodiment of the present invention will now be described in connection with FIGS. 10 and 11. The second embodiment of the lighting device is used for the vehicle display that has the display dials 21, 31, 41 and the movable indicator pointers 22, 32, 42, as mentioned in the first embodiment. Unlike the first embodiment, where the light guide rings 60, 70, 80 radiate the light of the light sources 95 toward the center of the display dials 21, 31, 41, the light is radiated outwardly from the drive shaft of the movable indicator pointers 22, 32, 42 toward the outer circumference of the display dials 21, 31, 41. Light sources 123 are disposed on a support arm 121 and radiate the light from the drive shaft of the movable indicator pointers 22, 32, 42 to the outer circumference of the display dials 21, 31, 41.

The second embodiment will now be described in connection with speedometer 30. It, however, is contemplated that the vehicle display lighting device in accordance with the second embodiment may be used with one or more of the display dials, discussed above. The support arm 121 is placed in front of the drive shaft of the movable indicator pointer 32 so as to cover the shaft of the display dial 31. The support arm 121 has a generally flat plate shape extending vertically upward from a center of the lower end of the display dial 31. The leading end of the support arm 121 has essentially a semi-circular shape and is laid over the drive shaft of the movable indicator pointer 32 so as to cover the entire drive shaft. As shown in FIG. 11, there is a gap between the inner surface of the support arm 121 and the front surface of the drive shaft of the movable indicator pointer 32. Thus, the support arm 121 never interferes with the movable indicator pointer 32.

Figure 11:
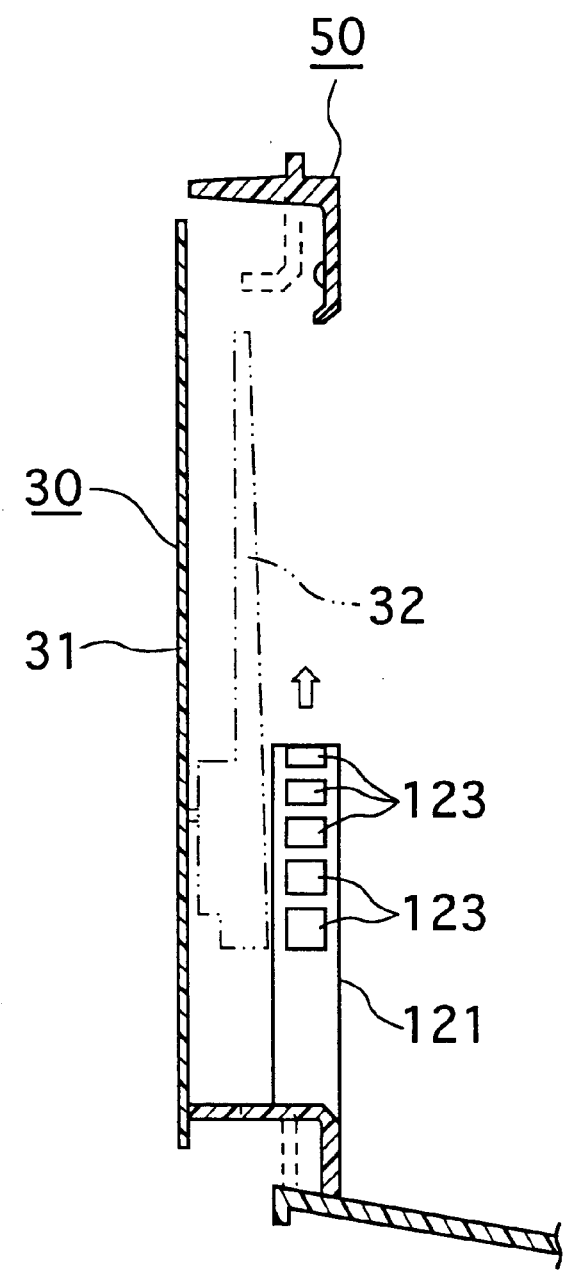
FIG. 11 is a cross-sectional view of the vehicle display lighting device of FIG. 10 mounted on the vehicle display, which corresponds to the cross-sectional view taken along line IX—IX of FIG. 7.

The light sources 123 are arranged in an arcuate manner along the outer circumference of the round-shaped leading end of the support arm 121, as shown in FIG. 11. The light sources 123 are provided in an angular range corresponding to an angular range of the symbols of the display dial 31. The light sources 123 emit light essentially in a radial direction about the center of the drive shaft thereby illuminating the entire display dial 31 and the movable indicator pointer 32. It is preferable that a plurality of light sources 123 are arranged on the leading end of the support arm 121 at prescribed intervals. A control unit similar to the control unit 113 of the first embodiment drives the light sources 123 and controls their light emission. Multi-color LEDs may be used for the light sources 123. The light sources 123 are controlled to emit a desired color of light by the color switch 115, as described in the first embodiment.

The support arm 121 and the light sources 123 are placed at the front side of the display dial 31. The light sources 123 light up the display dial 31 and the movable indicator pointer 32 directly from the front side of the display dial 31. No space for the light source and the like is needed in the interior of the vehicle display. Like the first embodiment, the vehicle display has a reduced profile and a simplified internal structure. Furthermore, the transmission path of the light of the light sources 123 is reduced, so that the attenuation rate of the light decreases and the illumination efficiency improves.

The light from the light sources 123 travels essentially in a radial direction outwardly from the drive shaft. The light radiates in many directions from the drive shaft toward the outer circumference of the display dial 31. Consequently, regardless of the position of the movable indicator pointer 32, the multiple light sources 123 prevent formation of shadows of the movable indicator pointer 32. The shadow of the movable indicator pointer 32 is never cast on the display dial 31 and the visibility of the vehicle display is improved. Furthermore, the light sources 123 emit light in a radial direction from the center to the outer circumference of the display dial 31, thereby illuminating all of the symbols on the display dial 31. Consequently, the illumination does not differ between the upper and lower parts of the display dial 31, thereby improving the visibility.

It is contemplated that the light sources 123 may be arranged at intervals wider than described above. It is preferable to appropriately design the support arm 121 such that the support arm 121 appears unified with the lower part of each of the displays. With such shape, the support arm 121 never impairs the design effects of the vehicle display.

Figure 12:
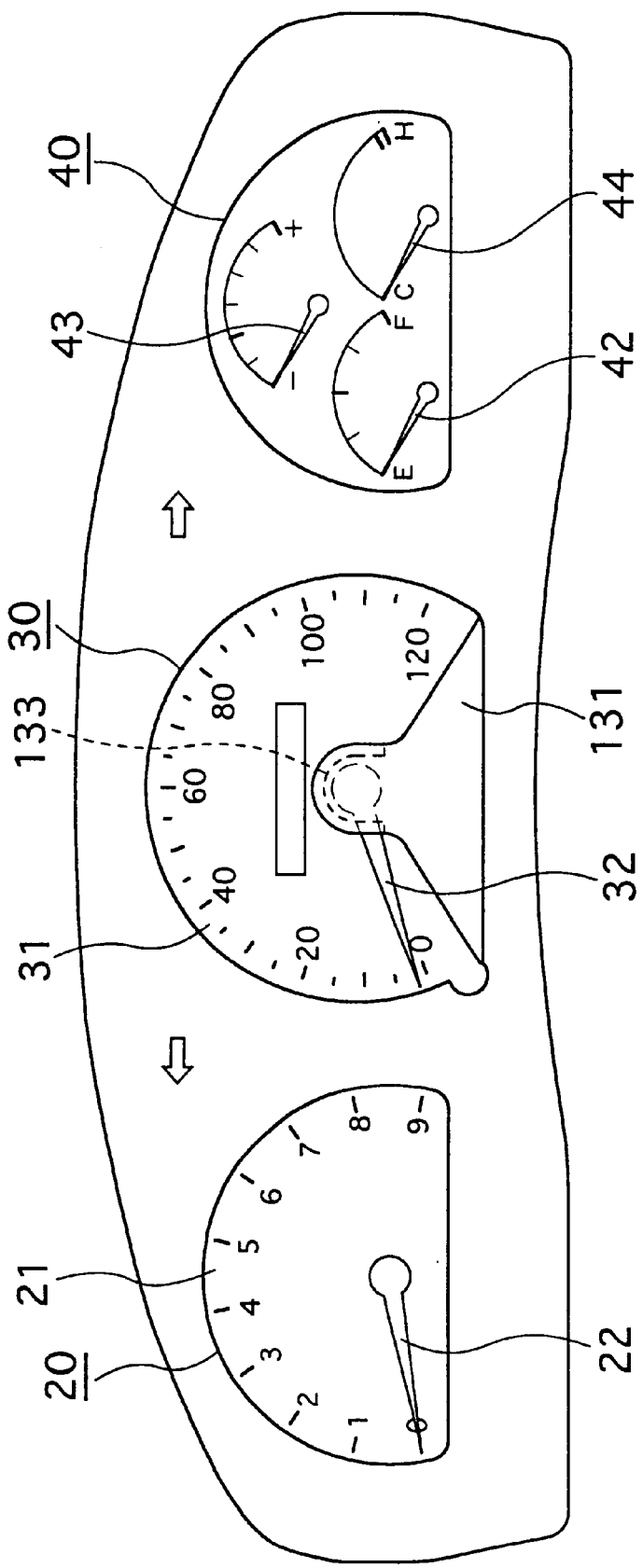
FIG. 12 is a front view of a vehicle display incorporating a vehicle display lighting device according to a third embodiment of the present invention.

A vehicle display lighting device according to a third embodiment of the present invention will now be described in connection with FIG. 12. In the third embodiment of the lighting device, the structure of the support member 131 differs from the support member 121. Other elements are the same as those described above. In the third embodiment, the support piece 131 is designed to appear unified with the lower end of the display dial 30. FIG. 12 shows only the support piece 131 for the speedometer 30, however, the other display dials 20 and 40 can also be provided with a similar support piece 131. The support piece 131 has essentially a sector shape that extends upward from the entire lower end of the display dial 31. A leading end of the support piece 131 has essentially a semi-circular shape and is laid over the drive shaft of the movable indicator pointer 32 so as to cover the entire drive shaft. Like support piece 121, there is a gap between the inner surface of the support piece 131 and the front surface of the drive shaft such that the support piece 131 never interferes with the movable indicator pointer 32.

The light sources 133 are arranged along the outer circumference of the round-shaped leading end of the support piece 131, as shown in FIG. 12. The light sources 133 are arranged to correspond to the angular range of the symbols of the display dial 31. The light sources 133 emit light in a radial direction about the center of the drive shaft, thereby illuminating the entire display dial 31 and the movable indicator pointer 32. A plurality of light sources 133 are arranged on the leading end of the support piece 131 at prescribed intervals. The control unit drives the light sources 133 and controls their light emission in the same manner as described above. Multi-color LEDs may be used for the light sources 133. The light sources 133 are controlled to emit a desired color of light by the color switch 115, in the manner described above.

The above-described lighting device operates in the same way and has the same advantages as the second embodiment. The support member consists of the support piece 131 having a shape unified with the display dial 30 to improve the design or ornamental appearance.

In the above-described embodiments, an LED having two or more desired colors of LED chips may be used as the light sources 95, 123, 133 in place of the three primary colors of LED chips. Alternatively, a single color LED can also be used, or an LED lamp may be used instead of the LED chip. Other light sources are considered to be well within the scope of the present invention.

Figure 13:
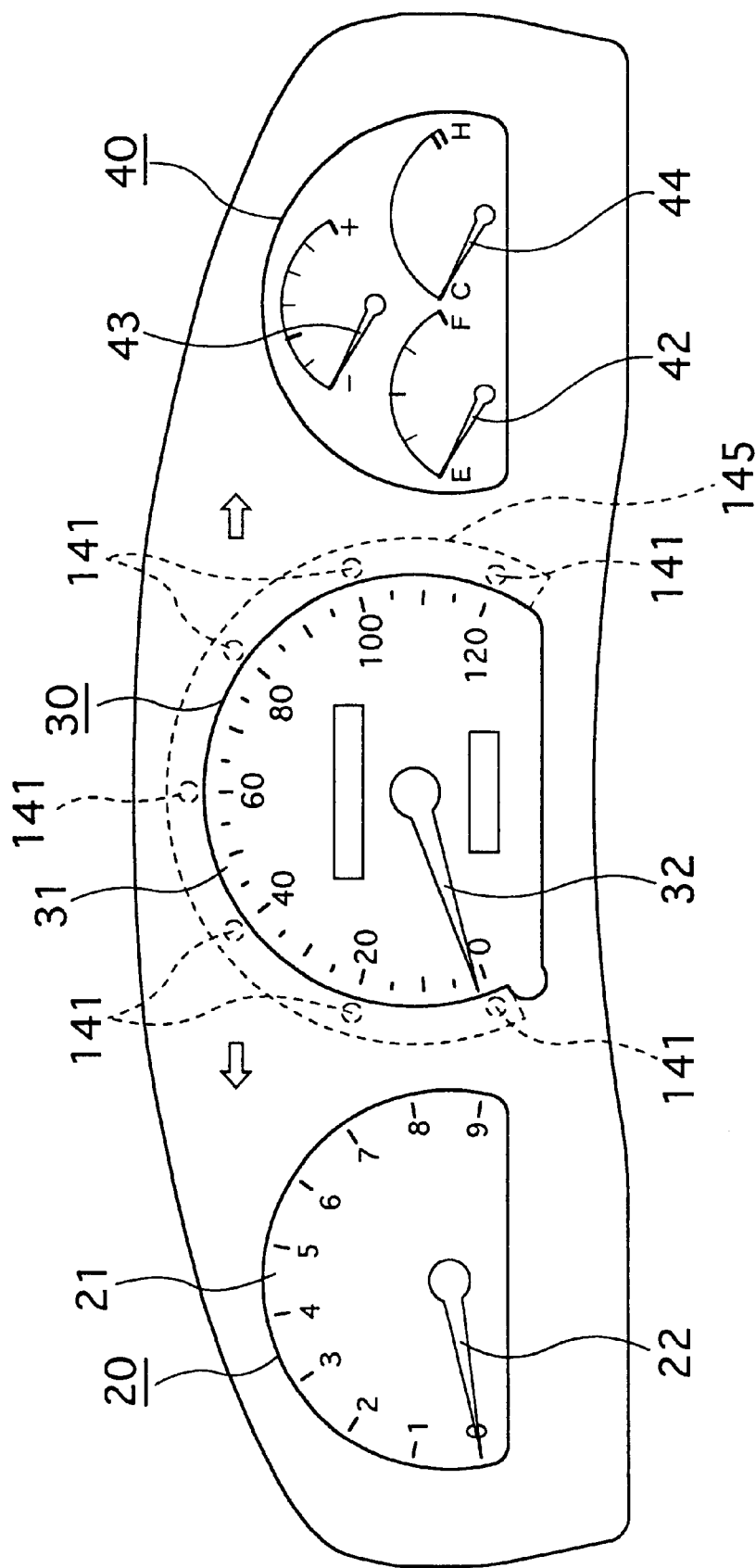
FIG. 13 is a front view of a vehicle display incorporating a vehicle display lighting device according to a fourth embodiment of the present invention.
Figure 14:
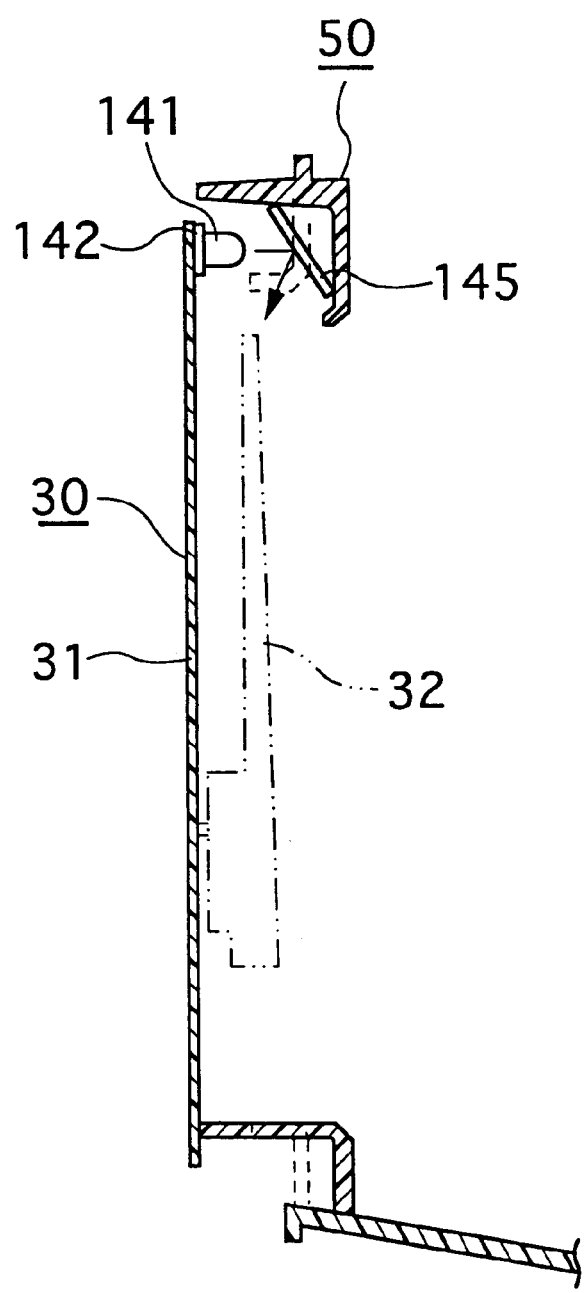
FIG. 14 is a cross-sectional view of the vehicle display lighting device of FIG. 13 mounted on the vehicle display, which corresponds to the cross-sectional view taken along line IX—IX of FIG. 7.

A vehicle display lighting device according to a fourth embodiment of the present invention will now be described in connection with FIGS. 13 and 14. The fourth embodiment of the vehicle display lighting device is used for the vehicle display having the display dials 21, 31, 41 and movable indicator pointers 22, 32, 42. Unlike the light guide rings 60, 70, 80 which radiate the light of the light sources 95 toward the center of the display dials 21, 31, 41, the light of light sources 141 is reflected by a reflection mirror 145 and radiated to the center of the display dials 21, 31, 41, as shown in FIG. 13. Specifically, a plurality of light sources 141 made of dome-shaped LED lamps are placed near and along the outer circumference of the display dials 21, 31, 41 at the front side thereof. FIGS. 13 and 14 show only such arrangement of the light sources 141 used for the speedometer 30, however, the other displays 20 and 40 can also be provided with a similar lighting structure. The light sources 141 are disposed along the outer circumference of the display dial 31 at prescribed intervals. In FIG. 13, the light sources 141 are provided along the circumference to correspond to the speed indicia. The light sources 141 are mounted on a printed circuit board 142 as shown in FIG. 14.

The printed circuit board 142 is fixed on the front surface of the display dial 31 near the outer circumference thereof. The light sources 141 are able to emit the light in a direction essentially perpendicular to the plane of the display dial 31.

The reflection mirror 145 is placed along the outer circumference of the display dial 31 and in front of the movable indicator pointer 32 or at the rear side of the front end portion of the instrument base 50. The reflection mirror 145 has a shape corresponding to the shape of the opening for the display dial 31. The reflection mirror 145 is fixed on the inner surface of the front side of the instrument base 50 in a slanted manner, as shown in FIG. 14. The reflection mirror 145 faces the light sources 141 and reflects the light toward the drive shaft of the movable indicator pointer 32. A control unit similar to the control unit 113 drives the light sources 141 and controls their light emission. Multi-color LEDs may be used as the light sources 141. The light sources 141 are controlled to emit a desired color of light by the color switch 115.

The light sources 141 are driven by the control unit in the same manner as described above in connection with the other embodiments. The light of the light sources 141 radiates to the reflection mirror 145 and is reflected by the reflection mirror 145. The reflection mirror 145 radiates the light of the light sources 141 from the outer circumference toward the center of the display dial 31. The light radiates to the display dial 31 and the movable indicator pointer 32 via the reflection mirror 145. The light sources 141 and the reflection mirror 145 are placed at the front side of the display dial 31 and are an external structure of the display. The light sources 141 light up the display dial 31 and the movable indicator pointer 32 directly from the front side of the display dial 31. As described above in connection with the other embodiments, no space for the light source is needed in the interior of the vehicle display.

Like the embodiments described above, the transmission path of the light from the light sources 141 is short and the attenuation rate of the light is small. As a result, it is possible to illuminate the vehicle display with fewer light sources. The reflection mirror 145 is disposed at the outer circumference of the display dial 31 and is covered by the masking plate 51 so as not to be seen by the vehicle operator. Furthermore, since the light is radiated toward the drive shaft of the movable indicator pointer 32 in many directions, there are no visible shadows of the movable indicator pointer 32 on the display dial 31. The location of the reflection mirror 145 along the outer circumference of the display dial 31 uniformly illuminates all of the symbols on the display dial 31, wherein the illumination is not different between the upper part and the lower part of the display dial 31.

The light sources 141 may be constructed such that it can emit plural colors of light. For example, the light sources 141 may be composed of the multi-color LEDs. In this case, the illumination color by the light sources 141 can be changed as desired.

Figure 15:
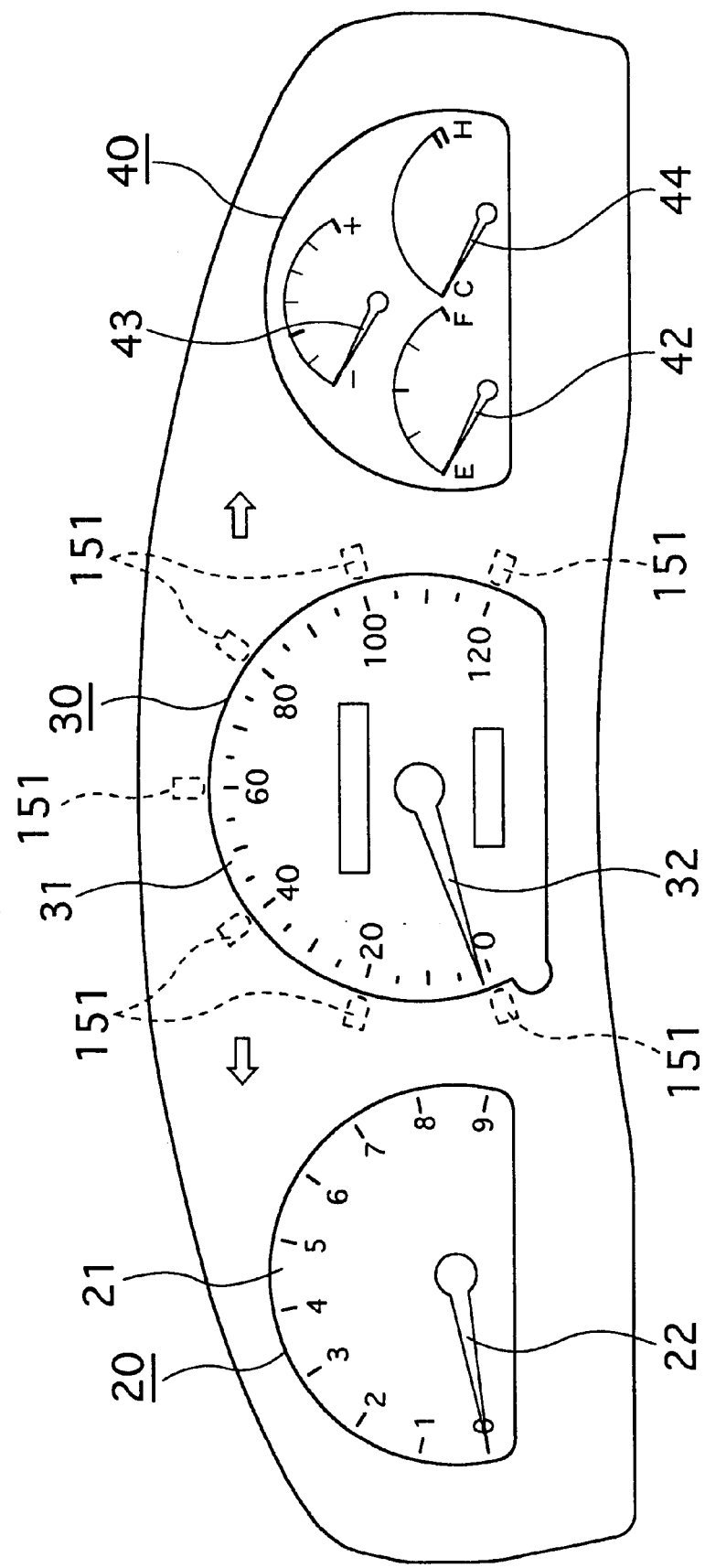
FIG. 15 is a front view of a vehicle display incorporating a vehicle display lighting device according to a fifth embodiment of the present invention.
Figure 16:
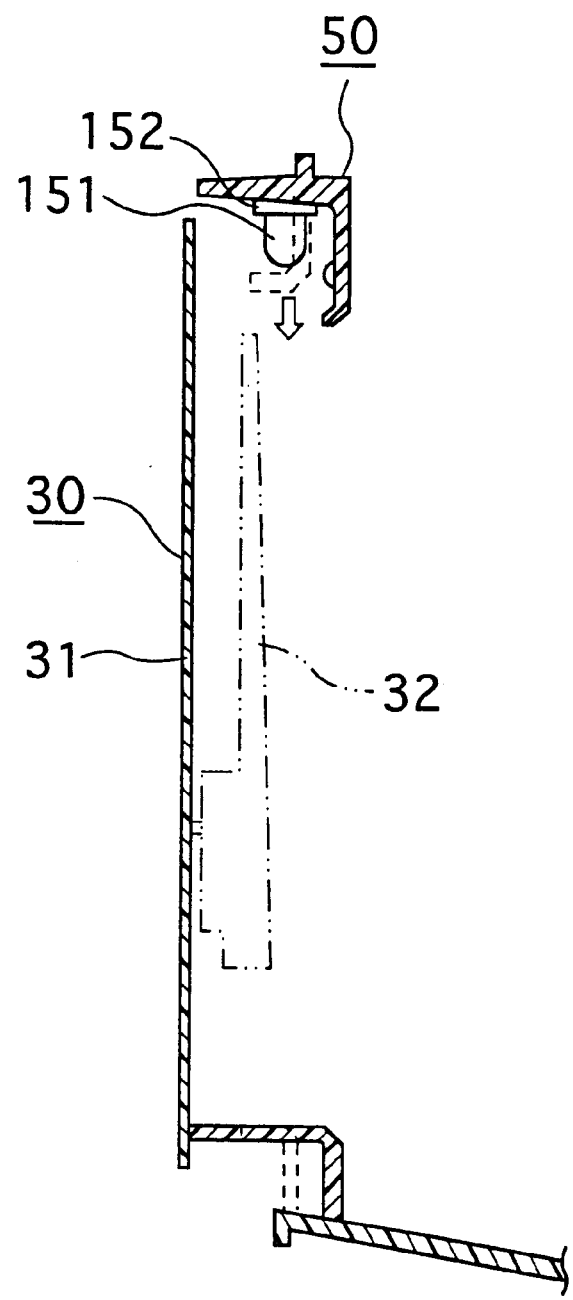
FIG. 16 is a cross-sectional view of the vehicle display lighting device of FIG. 15 mounted on the vehicle display, which corresponds to the cross-sectional view taken along line IX—IX of FIG. 7.

A vehicle display lighting device according to a fifth embodiment of the present invention will now be described in connection with FIGS. 15 and 16. The fifth embodiment differs from the fourth embodiment in that the reflection mirror 145 is omitted. The light 151 directly emit from the outer circumference to the center of the display dial 31. Otherwise, the structure is similar to the embodiment described in connection with FIGS. 13 and 14. A plurality of light sources 151 including dome-shaped LED lamps are placed in an arcuate arrangement along the outer circumference of the display dial 31 at the front side thereof. FIGS. 15 and 16 show only such arrangement of the light sources 151 used for the speedometer 30. It, however, is contemplated that the other displays 20 and 40 may also be provided with this lighting arrangement. In FIG. 15, the light sources 151 are provided along the circumference to correspond to the speed indicia on the display dial 31. The light sources 151 are mounted on a flexible printed circuit board 152. The printed circuit board 152 is fixed on an inner surface of the outer peripheral wall of the instrument base 50 in an arcuate shape using a suitable fastener. The light sources 151 are positioned in front of the movable indicator pointer 32 and emit light toward the drive shaft of the movable indicator pointer 32.

A control unit drives the light sources 151 and controls the light emission in the manner described above. Multi-color LEDs may be used for the light sources 151. The light from the light sources 151 travels from the outer circumference toward the center of the display dial 31. The light is radiated directly to the display dial 31 and the movable indicator pointer 32. Like the above-described embodiments, the light sources 151 are placed on the front side of the display dial 31. The light sources 151 illuminate the display dial 31 and the movable indicator pointer 32 directly from the front side of the display dial 31. As a result, the transmission path of the light is short and the attenuation rate of the light is small. Furthermore, it is possible to illuminate the vehicle display with fewer light sources. The light sources 151 emit light uniformly across the entire display dial 31. No shadows are formed on the display dial 31 by the movable indicator pointer 32.

The light sources 151 are disposed along the outer circumference of the display dial 31 and are covered by the masking plate 51. The light sources 151 are not visible to the vehicle operator.

While a dome-shaped LED lamp is the preferred light source for the light sources 141, 151, the present invention is not limited to LED lamps; rather, it is contemplated that single or multi-color LED chips may be used. Furthermore, other low profile light sources may be used.

Figure 17:
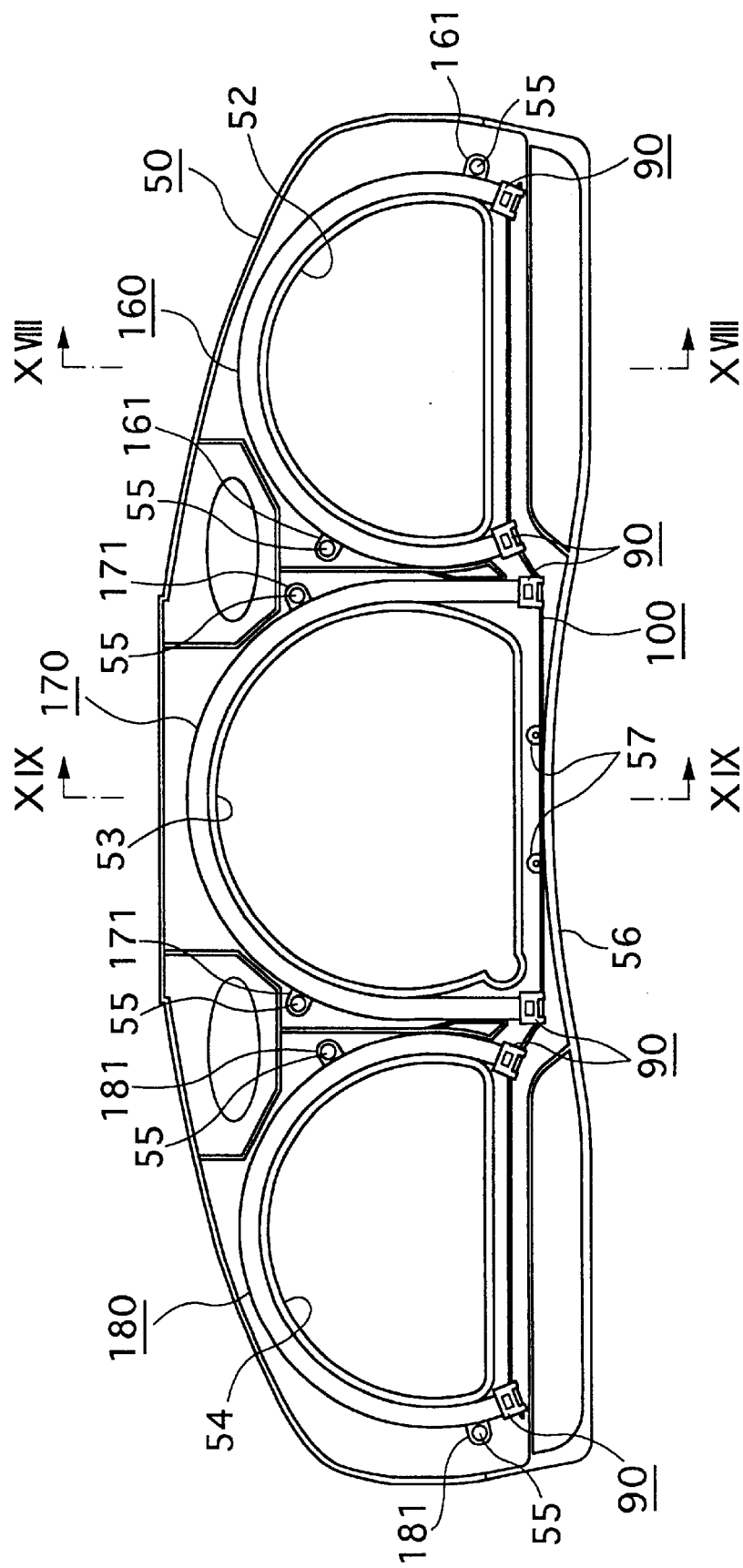
FIG. 17 is a rear view of a vehicle display lighting device according to a sixth embodiment of the present invention that is attached to a vehicle display.
Figure 18:
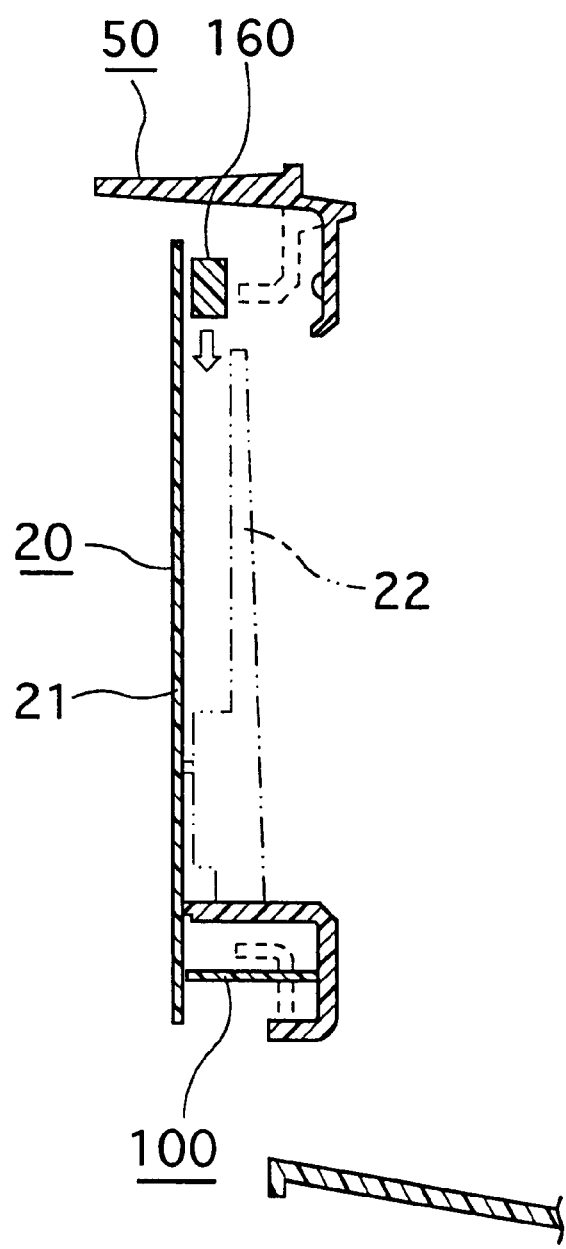
FIG. 18 is a cross-sectional view taken along line XVIII—XVIII of FIG. 17.
Figure 19:
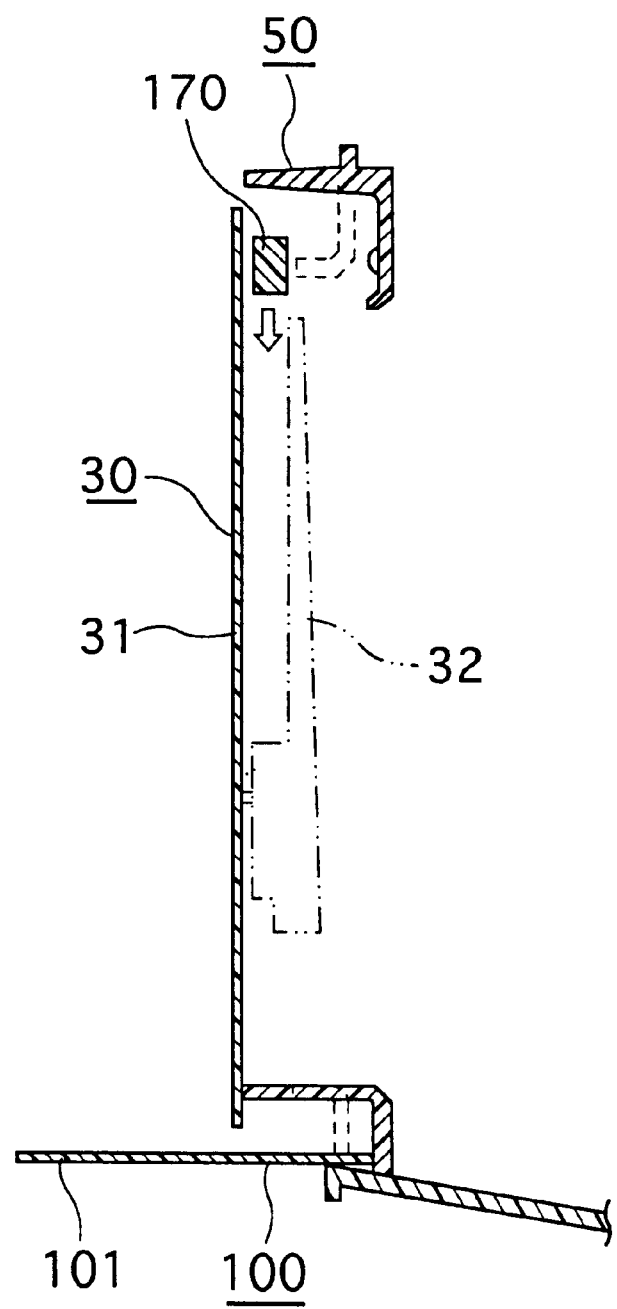
FIG. 19 is a cross-sectional view taken along line XIX—XIX of FIG. 17.

A vehicle display lighting device according to a sixth embodiment of the present invention will now be described in connection with FIGS. 17–19. The structure of the vehicle display of the embodiment described in FIGS. 17–19 is similar to the embodiment described in FIGS. 1 to 9. As shown in FIG. 17, the lighting device has light guide rings 160, 170 and 180 having essentially arcuate shapes. The structure of the rings 160, 170, 180 such as material, profile and dimension is similar to the rings 60, 70, 80. The rings 160, 170, 180 are placed along the circumferences of the openings 52, 53, 54 of the masking plate 51 and are not visible to the vehicle operator.

Attaching pieces 161, 171 and 181 are integrally formed on the light guide rings 160, 170 and 180 at positions corresponding to the caulking protrusions 55. The attaching pieces 161, 171, 181 are similar to the attaching pieces 61, 71, 81 and are secured to the caulking protrusions 55. It, however, is contemplated that other means such as clips and the like can be used to secure the light guide rings 160, 170, 180 to the base 50.

As shown in FIGS. 18 and 19, the light guide rings 160, 170, 180 are disposed between the display dials 21, 31, 41 and the movable indicator pointers 22, 32, 42 in a direction generally perpendicular to a plane of the display dials 21, 31, 41. Unlike the light guide rings 60, 70, 80, which are disposed in front of the movable indicator pointers 22, 32, 42, the rings 161, 171, 181 are positioned between the movable indicator pointers 22, 32, 42, and the display dials 21, 31, 41. In the sixth embodiment, the caulking protrusions 55 are formed on the rear surface of the masking plate 51 so as to protrude nearly up to the front surface of the display dials 21, 31, 41 so that the rings 160, 170, 180 can be positioned and fixed at such positions. Moreover, a positioning element such as a stepped portion or a flanged portion is formed near the leading end of the caulking protrusion 51. The positioning element is configured to touch and position the front surface of the attaching pieces 161, 171, 181. The positioning element also blocks the attaching piece 161, 171, 181 from moving toward the base end of the caulking protrusion 55. It is also contemplated that caulking protrusions similar to the caulking protrusions 55 may be formed on the front surface of the outer circumference of the display dials 21, 31, 41 at such positions as to be covered by the masking plate 51. Supporting protrusions similar to the supporting protrusions 51a may be formed on the front surface of the outer circumference of the display dials 21, 31, 41 to support the rear surface of the attaching pieces 161, 171, 181.

The rings 160, 170, 180 are arranged around the circumferences of the display dials 21, 31, 41, as shown in FIG. 17. Each ring 160, 170, 180 guides the light in a manner described above in connection with rings 60, 70, 80. It is also preferable to provide a reflecting film such as a white paint or a reflecting agent on the outer peripheral surface and both front and rear surfaces of the rings 160, 170, 180. The LED cases 90, described above, are fitted on the opposite ends of the rings 160, 170, 180. A flexible PCB 100 containing light sources 95 are secured to the LED cases 90, as described above.

The switch 115 is operated to drive and light the light sources 95 through the control unit 113. The light sources 95 emit the light toward the inside of the rings 160, 170, 180 in a similar manner as described above in connection with rings 60, 70, 80. The light sources 95 and the rings 160, 170, 180 are positioned between the display dials 21, 31, 41 and the movable indicator pointers 22, 32, 42. The movable indicator pointers 22, 32, 42 are not interposed between the light sources 95 and the rings 160, 170, 180 and the display dials 21, 31, 41. As a result, the light is never obstructed by the movable indicator pointers 22, 32, 42. The light of the light sources 95 smoothly travels across the space between the display dials 21, 31, 41 and the movable indicator pointers 22, 32, 42, thereby uniformly illuminating the entire display dials 21, 31, 41. The shadow of the movable indicator pointers 22, 32, 42 is never cast on the display dials 21, 31, 41. Since light is radiated from the rear side of the movable indicator pointers 22, 32, 42 by the rings 160, 170, 180, the movable indicator pointers 22, 32, 42 are silhouetted by the illumination.

Figure 20:
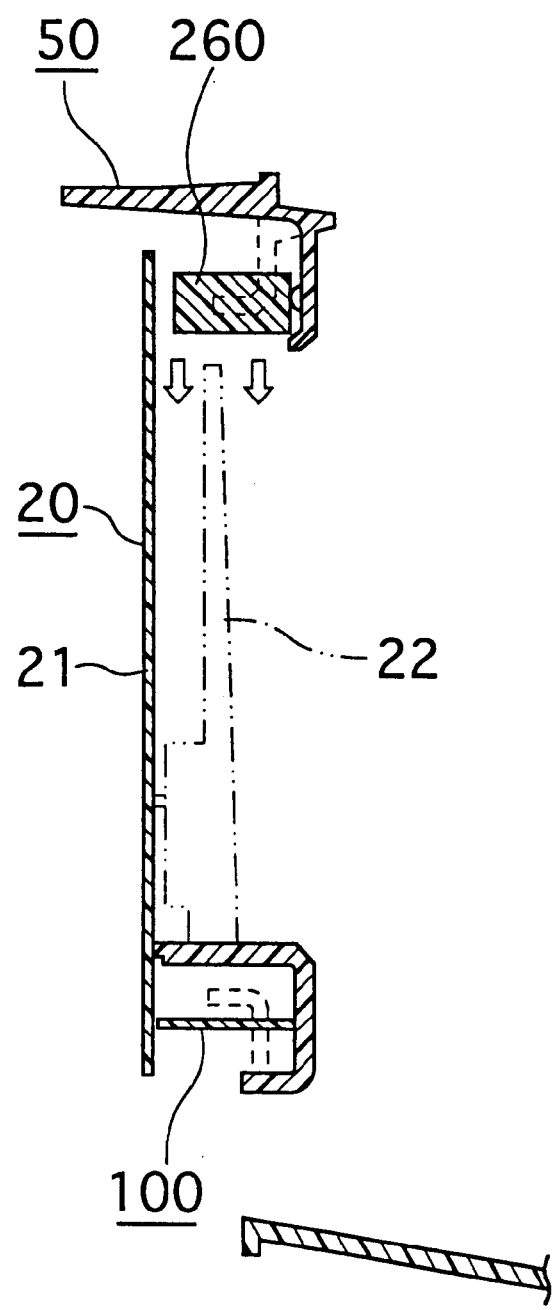
FIG. 20 is a cross-sectional view of a vehicle display lighting device according to a seventh embodiment of the present invention that is mounted on a vehicle display, which corresponds to the cross-sectional view taken along line XVIII—XVIII of FIG. 17.
Figure 21:
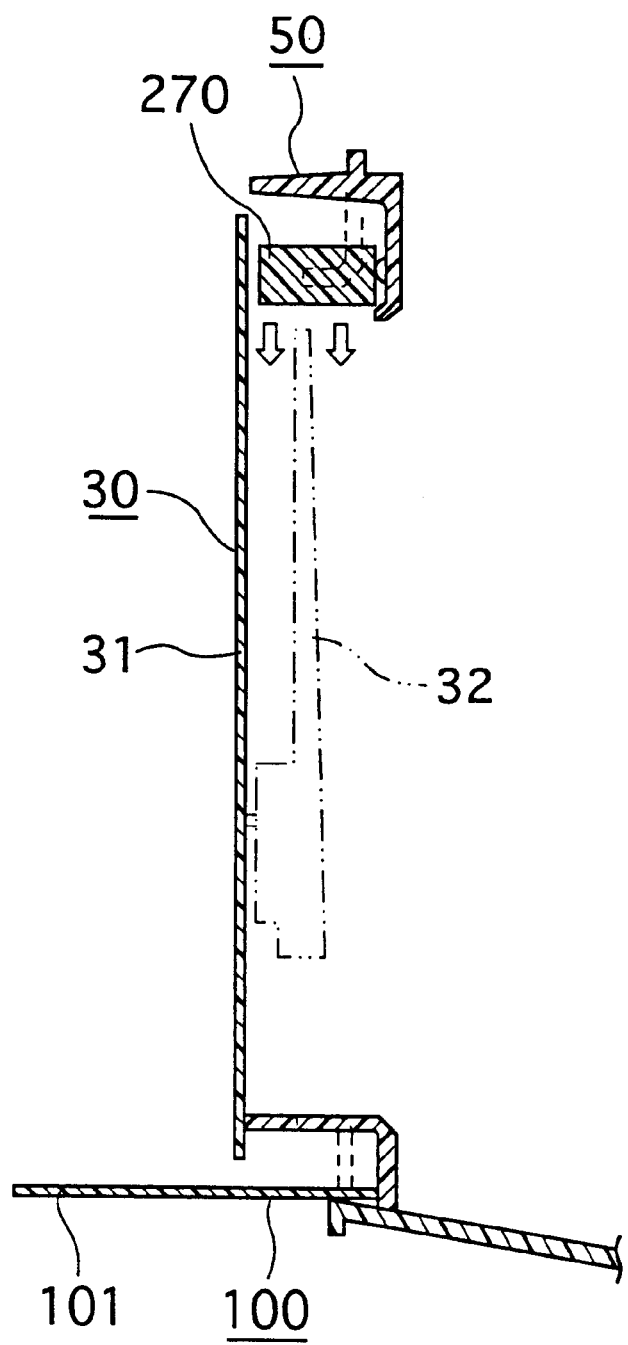
FIG. 21 is a cross-sectional view of the vehicle display lighting device of FIG. 20 mounted on the vehicle display, which corresponds to the cross-sectional view taken along line XIX—XIX of FIG. 17.

A vehicle display lighting device according to a seventh embodiment of the present invention will now be described in connection with FIGS. 20 and 21. The lighting device of FIGS. 20 and 21 has a similar construction to the embodiment described in FIGS. 17–19 with the exception of the location of the light guide rings. Specifically, the light guide rings 260, 270 have a thickness larger than the thickness of the light guide rings 160, 170, 180. FIGS. 20 and 21 show only the light guide rings 260, 270 for the speedometer 30 and the tachometer 20. Though not shown, a light guide ring for the auxiliary display has a similar structure to the rings 260, 270 and a larger thickness than the ring 180. The rings 260, 270 have an increased thickness such that each extends beyond the movable indicator pointers 22, 32. As a result, the light of the light sources 95 is radiated to the space between the display dials 21, 31, 41 and the movable indicator pointers 22, 32, 42 as well as the space in front of the movable indicator pointers 22, 32, 42. Accordingly, the entire display dials 21, 31, 41 and the front surface of the movable indicator pointers 22, 32, 42 are uniformly illuminated with sufficient brightness.

While the rings 160, 170, 180 and the rings 260, 270 have essentially an arcuate shape, it is contemplated that other shapes are possible so long as the rings correspond to the shape of the openings for the display dials 21, 31, 41.

Figure 22:
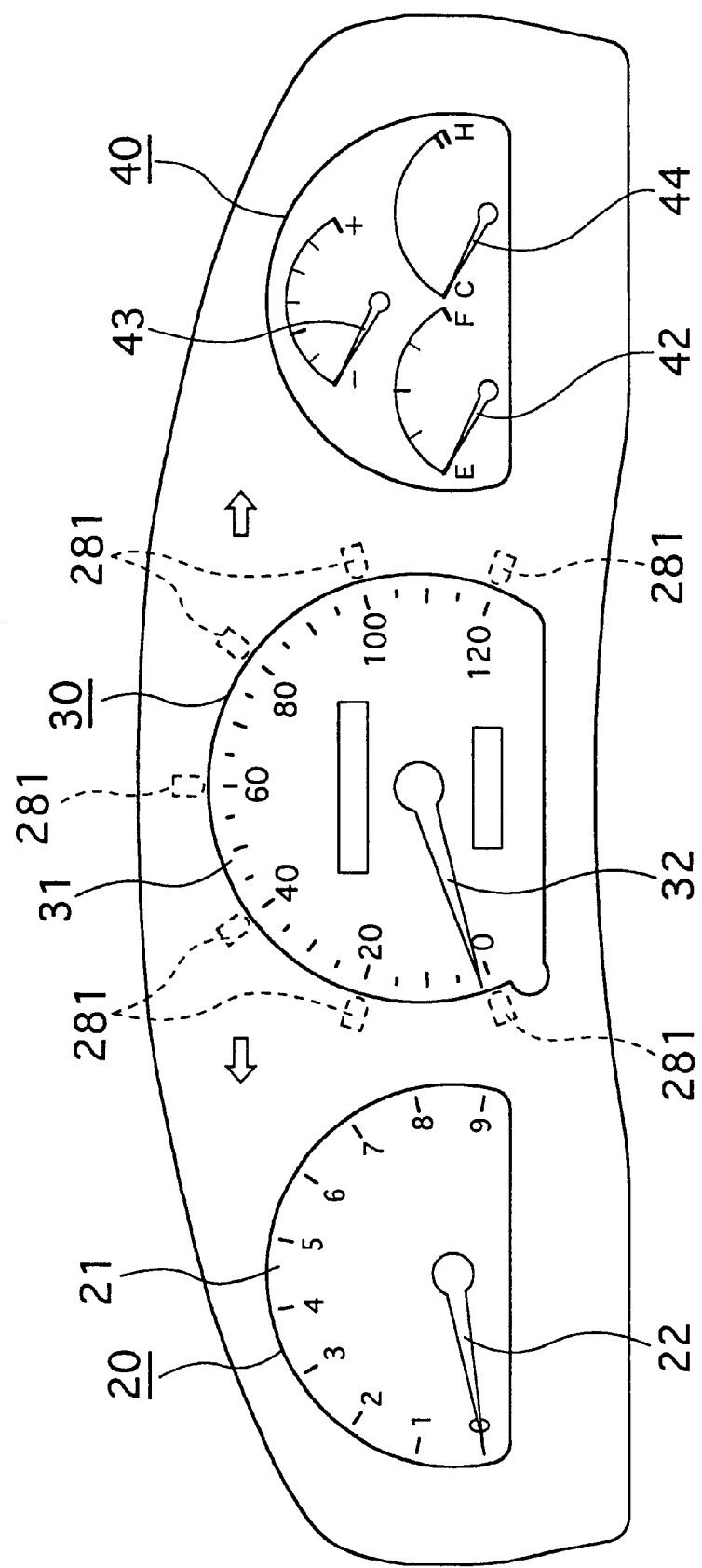
FIG. 22 is a front view of a vehicle display incorporating a vehicle display lighting device of according to an eighth embodiment of the present invention.
Figure 23:
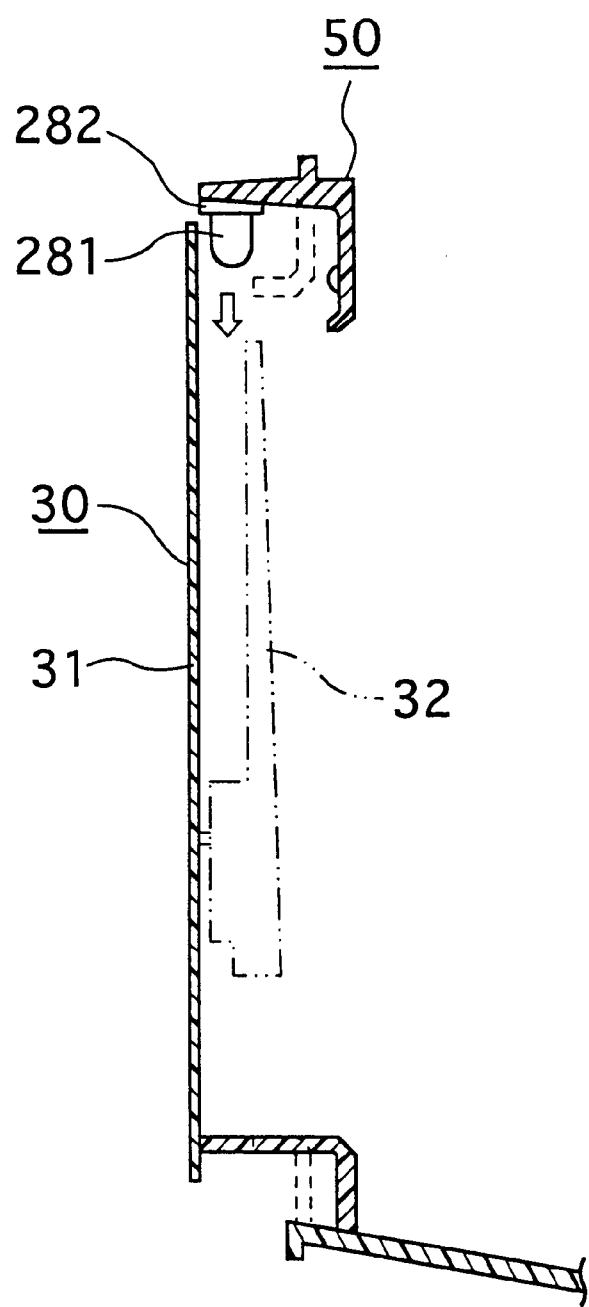
FIG. 23 is a cross-sectional view of the vehicle display lighting device of FIG. 22 mounted on the vehicle display, which corresponds to the cross-sectional view taken along line XIX—XIX of FIG. 17.

A vehicle display lighting device according to an eighth embodiment of the present invention will now be described in connection with FIGS. 22 and 23. The lighting device includes a plurality of dome-shaped light sources 281. The light sources 281 are placed at the outer circumference of the front surface of the display dials 21, 31, 41 essentially in an arcuate arrangement. FIGS. 22 and 23 only show the light sources 281 for the speedometer 30. Specifically, the light sources 281 are arranged at prescribed intervals along the circumference to correspond to the speed indicia on the display dial 31.

The light sources 281 are located between the display dials 21, 31, 41 and the movable indicator pointers 22, 32, 42 in a direction perpendicular to the plane of the display dials 21, 31, 41. The light sources 281 emit light between the display dials 21, 31, 41 and the movable indicator pointer. As a result, the light is never obstructed by the movable indicator pointer. The light of the light sources 281 smoothly travels across the space between the display dial and the movable indicator pointer, thereby uniformly illuminating the entire display dial. Additionally, the movable indicator pointer is silhouetted by the illumination. The light sources 281 are mounted on a flexible PCB 282. The flexible PCB 282 is connected with the control unit 113.

It will be apparent to those skilled in the art that various modifications and variations may be made without departing from the scope of the present invention. For example, the symbols on the display dials 21, 31, 41 and the movable indicator pointer may include of a fluorescent material such as a fluorescent paint, a phosphorescent material or other luminescent material. The light sources 95, 123, 133, 141, 151, 281 may be an LED that can emit a short wave light. With such configuration, the light sources 95, 123, 133, 141, 151, 281 emit the short wave light to fluorescently light up the symbols. In contrast with the lamp bulb, the LED consumes less electric power, generates no heat in emitting the light and is generally smaller in size. Moreover, the LED is a relatively small light source and its light radiation range may be small. Therefore, some consideration is necessary for the uniformity of the illumination.

The LED that can emit the short wave light may be composed of not only a usual short wave LED emitting only the short wave light but also a wide range LED that can emit a visible light as well as the short wave light. The short wave light is preferably an ultraviolet light having a peak emission wavelength of about 380 nm and a spectral half bandwidth of about 40 nm. If the wavelength is shorter than that, it is possible that a synthetic resin material of the dial and the like and the luminescent material are deteriorated soon. On the other hand, if the wavelength is longer than that, the luminescent material cannot be sufficiently excited, so that the luminescent light of the symbols of the dial may be weak. An aluminum-gallium-nitride ($Al_xGa_{1-x}N$) LED can be used for such short wave LED, for example. In case of using an ultraviolet light having a peak emission wavelength of about 380 nm and a spectral half band width of about 20 nm, more advantageous effects are obtained.

Thus, it is intended that the present invention covers the modifications and variations of the invention, provided they come within the scope of the appended claims and their equivalents. The preferred embodiments described herein are illustrative and not restrictive, the scope of the invention being indicated in the appended claims and all variations which come within the meaning of the claims are intended to be embraced therein.

What is claimed is:

1. A lighting device for a vehicle display having at least one display dial, wherein each of the at least one display dial has a front surface, an outer circumference and at least one indicator pointer spaced from the front surface, said lighting device comprising:
    a light emitting assembly arranged along the outer circumference of the display dial in front of the front surface, wherein said light emitting assembly directs light across at least the front surface of the display dial; and
    a control assembly for controlling the operation of said light emitting assembly,
    wherein said light emitting assembly includes at least one light source for emitting light and a transmitting assembly for radiating the light from said at least one light source across at least the front surface of the display dial,
    wherein said transmitting assembly is positioned adjacent the outer circumference of the display dial,
    wherein said transmitting assembly comprises a light guide ring positioned adjacent the outer circumference of the display dial, wherein the light from said at least one light source is transmitted through said light guide ring.

2. The lighting device according to claim 1, wherein said light source is a light emitting diode.

3. The lighting device according to claim 2, wherein the front surface includes a plurality of symbols formed thereon, wherein the plurality of symbols are formed from a luminescent material, wherein said light emitting diode is a short wave light emitting diode.

4. The lighting device according to claim 1, wherein said light guide ring includes a coating on at least one surface to direct light from said at least one light source across at least the front surface of the display dial.

5. The lighting device according to claim 4, wherein said light guide ring directs light from said at least one light source only across the front surface of the display dial.

6. The lighting device according to claim 5, wherein said light guide ring is positioned adjacent the outer circumference between the front surface and the indicator pointer.

7. The lighting device according to claim 4, wherein said light guide ring directs light from said at least one light source across the front surface of the display dial and the indicator pointer.

8. The lighting device according to claim 7, wherein said light guide ring is positioned adjacent the outer circumference in front of the front surface and the indicator pointer.

9. The lighting device according to claim 7, wherein said light guide ring is positioned adjacent the outer circumference such that said light guide ring extends from the front surface to a point in front of the indicator pointer.

10. The lighting device according to claim 1, wherein said light guide ring includes a pair of free ends, wherein at least one light source is positioned adjacent each free end of said light guide ring.

11. The lighting device according to claim 10, further comprising:
    a light source housing secured to each free end of said light guide ring, wherein at least one light source is positioned within each light source housing.

12. The lighting device according to claim 11, further comprising:
    a flexible printed circuit board, wherein each light source housing is secured to said flexible printed circuit board, wherein each of said at least one light source is electrically connected to said flexible printed circuit board, wherein said control assembly is electrically connected to said flexible printed circuit board.

13. A lighting device for a vehicle display having at least one display dial, wherein each of the at least one display dial has a front surface, an outer circumference, a scale located along at least a portion of the outer circumference for indicating at least one variable and at least one indicator pointer spaced from the front surface, said lighting device comprising:
    a light emitting assembly arranged along the outer circumference of the display dial in front of the front surface, wherein said light emitting assembly directs light across at least the front surface of the display dial; and
    a control assembly for controlling the operation of said light emitting assembly,
    wherein said light emitting assembly includes a plurality of light sources for emitting light and a transmitting assembly for radiating the light from said plurality of light sources across at least the front surface of the display dial,
    wherein said transmitting assembly comprises a reflection mirror positioned adjacent the outer circumference of the display dial, wherein the plurality of light sources are disposed along a portion of the outer circumference of the display dial at fixed intervals adjacent the scale, wherein the light from said plurality of light sources is reflected by said reflection mirror.

14. The lighting device according to claim 13, wherein the reflection mirror is positioned in front of the front surface of the display dial and the indicator pointer such that the reflection mirror radiates the light from the plurality of light sources in a direction substantially parallel to the front surface of the display dial and in front of the front surface of the display dial and the indicator pointer.

15. The lighting device according to claim 13, wherein the plurality of light sources is positioned between the front surface of the display dial and the indicator pointer; and
    wherein the reflection mirror is positioned in front of the front surface of the display dial and the indicator pointer so as to face the plurality of light sources such that the reflection mirror radiates the light from the plurality of light sources in a direction substantially in parallel with the front surface of the display dial and in front of the front surface of the display dial and the indicator pointer.

16. The lighting device according to claim 13, wherein said plurality of light sources are positioned adjacent a portion of the outer circumference of the display dial where the scale is arranged adjacent said reflection mirror.

17. A lighting device for a vehicle display having at least one display dial, wherein each of the at least one display dial has a front surface, an outer circumference, a scale located along at least a portion of the outer circumference for indicating at least one variable and at least one indicator pointer spaced from the front surface, said lighting device comprising:

a light emitting assembly arranged along the outer circumference of the display dial in front of the front surface, wherein said light emitting assembly directs light across at least the front surface of the display dial; and a control assembly for controlling the operation of said light emitting assembly, wherein said light emitting assembly comprises:

a plurality of light sources for emitting light, wherein said plurality of light sources are located adjacent the outer circumference of the display dial and are disposed at fixed intervals adjacent the scale.

18. The lighting device according to claim 17, wherein the plurality of light sources is positioned in front of the front surface of the display dial and the indicator pointer so that the plurality of light sources radiates the light in a direction substantially in parallel with the indicator pointer.

19. The lighting device according to claim 17, further comprising:

a flexible printed circuit board, wherein each of the plurality of light sources is electrically connected to the flexible printed circuit board, wherein the control assembly is electrically connected to the flexible printed circuit board; and wherein the flexible printed circuit board is positioned adjacent and along the portion of the outer circumference of the display dial near the scale.

20. The lighting device according to claim 17, wherein each of said plurality of light source is a light emitting diode.

21. The lighting device according to claim 20, wherein the front surface includes a plurality of symbols formed thereon, wherein the plurality of symbols are formed from a luminescent material, wherein said light emitting diode is a short wave light emitting diode.

22. The lighting device according to claim 17, wherein said plurality of light sources emit light only across the front surface of the display dial.

23. The lighting device according to claim 22, wherein said plurality of light sources are positioned adjacent the outer circumference between the front surface and the indicator pointer.

24. The lighting device according to claim 17, wherein said plurality of light sources emit light across the front surface of the display dial and the indicator pointer.

25. The lighting device according to claim 24, wherein said plurality of light sources are positioned adjacent a portion of the outer circumference of the display dial adjacent the scale in front of the front surface of the display dial and the indicator pointer.

26. The lighting device according to claim 17, further comprising:

a flexible printed circuit board, wherein each of said plurality of light sources is electrically connected to said flexible printed circuit board, wherein said control assembly is electrically connected to said flexible printed circuit board.

27. The lighting device according to claim 26, wherein said flexible printed circuit board is positioned adjacent a portion of the outer circumference of the display dial adjacent the scale.

28. A lighting device for a vehicle display having at least one display dial, wherein each of the at least one display dial has a front surface, an outer circumference and at least one indicator pointer spaced from the front surface, said lighting device comprising:

a support member positioned in front of the front surface and the indicator pointer, wherein said support member includes an end portion that covers a portion of the front surface and the indicator pointer, wherein the end portion of the support member is positioned in front of a rotation axis of the indicator pointer, wherein the end portion of the support member having a plate shape covering the rotation axis of the indicator pointer, wherein the end portion of the support member has an outer circumference of a circular outline that surrounds the rotation axis of the indicator pointer;

a light emitting assembly located on said support member, wherein said light emitting assembly directs light across the front surface and the indicator pointer of the display dial; and a control assembly for controlling the operation of said light emitting assembly, wherein said light emitting assembly includes a plurality of light sources for emitting light, wherein said plurality of light sources are located adjacent said end portion, wherein each of said plurality of light sources is a light emitting diode, wherein the light emitting diodes are disposed on the outer circumference of the end portion of the support member at fixed intervals so as to emit light generally in a radial direction of the dial display from the rotation axis of the indicator pointer to the outer circumference of the dial display and directly illuminate the entire front surface of the dial display and the indicator pointer.

29. The lighting device according to claim 28, wherein the front surface includes a plurality of symbols formed thereon, wherein the plurality of symbols are formed from a luminescent material, wherein said light emitting diode is a short wave light emitting diode.

* * * * *